(12) United States Patent
Janakiraman et al.

(10) Patent No.: US 12,394,320 B2
(45) Date of Patent: Aug. 19, 2025

(54) SYSTEMS AND METHODS OF SITUATION AWARE EDGE ANALYTICS FRAMEWORK FOR AVIONICS IOT GATEWAYS

(71) Applicant: Honeywell International Inc., Charlotte, NC (US)

(72) Inventors: Kirupakar Janakiraman, Madurai (IN); Nayyar Azam Khan Rao, Bangalore (IN); Kalimulla Khan, Bangalore (IN); Prasanna M R H, Madurai (IN); Ramkumar Rajendran, Madurai (IN); Deepavali Dinkarrao Desai, Bangalore (IN); Aloke Roy, Baltimore, MD (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 319 days.

(21) Appl. No.: 17/704,532

(22) Filed: Mar. 25, 2022

(65) Prior Publication Data

US 2022/0406195 A1 Dec. 22, 2022

(30) Foreign Application Priority Data

Jun. 17, 2021 (IN) .............................. 202141027172

(51) Int. Cl.
*G08G 5/26* (2025.01)
*G08G 5/22* (2025.01)
*G08G 5/55* (2025.01)
*G08G 5/57* (2025.01)
*H04L 67/12* (2022.01)

(52) U.S. Cl.
CPC ................. *G08G 5/26* (2025.01); *G08G 5/22* (2025.01); *G08G 5/55* (2025.01); *G08G 5/57* (2025.01); *H04L 67/12* (2013.01)

(58) Field of Classification Search
CPC ...... B60W 30/12; B60W 50/038; H04L 67/12
See application file for complete search history.

(56) References Cited

U.S. PATENT DOCUMENTS

| 10,274,338 | B2 | 4/2019 | Boss et al. |
| 11,469,974 | B1* | 10/2022 | Cruise ................. G06F 11/3006 |
| 2019/0383627 | A1* | 12/2019 | Nangeroni ........ B60W 50/0098 |

(Continued)

FOREIGN PATENT DOCUMENTS

EP 3694237 A1 8/2020

OTHER PUBLICATIONS

European search report and Search opinion Mailed on Oct. 31, 2022 for EP Application No. 22179482, 9 page(s).

(Continued)

*Primary Examiner* — Wade Miles
*Assistant Examiner* — Jerrod Irvin Davis
(74) *Attorney, Agent, or Firm* — ALSTON & BIRD LLP

(57) ABSTRACT

Disclosed are methods, systems, and one or more computer-readable mediums for receiving, at an edge device from an external server, a rules database comprising a set of rules; receiving, by the edge device, first data from at least one device; processing, by the edge device, the received first data by comparing the received data to each rule among the set of rules; identifying a first triggering event in response to detecting a match between the received data and a rule of the rules database; and outputting an alert corresponding to the first triggering event.

13 Claims, 26 Drawing Sheets

(56) References Cited

U.S. PATENT DOCUMENTS

2020/0183387 A1* 6/2020 Heit .................. G06V 20/56
2021/0224701 A1* 7/2021 Bloomquist ........ H04L 67/5651
2021/0295614 A1* 9/2021 Camplejohn ......... G06F 16/254
2022/0343773 A1* 10/2022 Ali ..................... G08G 5/0008

OTHER PUBLICATIONS

EP Office Action Mailed on Apr. 19, 2024 for EP Application No. 22179482, 8 page(s).
EP Office Action Mailed on Jan. 3, 2025 for EP Application No. 22179482, 4 page(s).

\* cited by examiner

| S NO | COMPONENT NAME | FUNCTIONALITY |
|---|---|---|
| 1 | SDK CORE | IMPLEMENTATION OF THE EDGE SDK CORE CAPABILITIES |
| 2 | NODE AGENT | IMPLEMENTATION OF EDGE SDK NODE AGENT |
| 3 | INGRESS ENGINE | DATA INPUT STREAM IMPLEMENTATION |
| 4 | EGRESS ENGINE | DATA OUTPUT STREAM IMPLEMENTATION |
| 5 | EXPRESSION ENGINE | EDGE RUNTIME TO SUPPORT ANALYTICAL EXPRESSIONS |
| 6 | ANALYTICS RUNTIME | EDGE RUNTIME TO SUPPORT MACHINE LEARNING AND DEEP LEARNING MODELS IN THE EDGE |

*FIG. 5*

SOP ALERT

RULE NAME

| SOP ALERT |

HIGH WATERMARK | WINDOW DURATION | SLICE DURATION

| 10 | MSGS |  | 10 | SEC |  | 2 | SEC | [+]

CATEGORY NAME | TOPIC

[+]

| CID | LEFT | | LEFT AGG | OPERATION | RIGHT | RIGHT AGG |
|---|---|---|---|---|---|---|
| 1 | TAXISPEED | × | FIRST ∨ | < ∨ | 25 | ∨ |

[−]

[DELETE]  [×CANCEL] [SAVE]

*FIG. 18*

| HONEYWELL | | RUNNING |
|---|---|---|
| DEVICES | DEVICES / RASPBERRY PI | ✎ EDIT DEVICE |
| OVERVIEW | | |
| INGRESS | INGRESS | |
| RULES | | |
| APPLICATION | MQTT | RUNNING |
| EGRESS | FLIGHT_PHASE → /INGRESS/MQTT/FLIGHTPHASE | |
| | /SIGNAL/IN → /INGRESS/MQTT/SERIES | |
| LOGOUT | | |
| | RULES | |
| | TAXI SPEED DURING SANDSTORM | ACTIVE |
| | WINDOW DURATION 5s SLIDE DURATION 1s | |
| | HIGH WATERMARK 5 NOTIFICATIONS 1 | |
| | | |
| | APPLICATIONS | |
| | SOP MONITOR | RUNNING |
| | PERFORMS AN FFT ON A WINDOW OF DATA. | |
| | | |
| | EGRESS | |
| | MQTT | RUNNING |
| | /FFT/APPLICATION/FFT_OUT → FFT_OUT | |

*FIG. 19*

| | | RUNNING |
|---|---|---|
| DEVICES / RASPBERRY PI / INGRESS / MQTT | | +ADD NEW |

| | INCOMING URI | PROTOCOL | | TAG NAME |
|---|---|---|---|---|
| DEVICES OVERVIEW | | | | |
| INGRESS | | | | |
| RULES | FLIGHT_PHASE | MQTT | → | /INGRESS/MQTT/FLIGHTPHASE [FLOAT] |
| APPLICATION | /SIGNAL/IN | MQTT | → | /INGRESS/MQTT/SERIES [FLOAT] |
| EGRESS | GROUND_SPEED | MQTT | → | /INGRESS/MQTT/GROUNDSPEED [FLOAT] |
| | DIGITAL_ATIS_ALERT | MQTT | → | /INGRESS/MQTT/DIGITALATISALERT [FLOAT] |
| LOGOUT | LANDING_AIRPORT | MQTT | → | /INGRESS/MQTT/LANDINGAIRPORT [FLOAT] |

*FIG. 20*

Sidebar: DEVICES / OVERVIEW / INGRESS / RULES / APPLICATION / EGRESS / LOGOUT

DEVICES / RASPBERRY PI / RULES / RULE  [RUNNING]

TAXI SPEED DURING SANDSTORM

RULE NAME: TAXI SPEED DURING SANDSTORM

APPLICATION: FFT / PERFORMS AN FFT ON A WINDOW OF DATA. ⌄

| | WINDOW DURATION | | HIGH WATERMARK | |
|---|---|---|---|---|
| HIGH WATERMARK: 5 MSGS | 5 | SEC | 5 | SEC |

CATEGORY NAME  [+]

| | TOPIC | |
|---|---|---|
| FLIGHTPHASE | /MQTT/INGRESS/FLIGHTPHASE ⌄ | [−] |
| GROUNDSPEED | /MQTT/INGRESS/GROUNDSPEED ⌄ | [−] |
| DIGITALATISALERT | /MQTT/INGRESS/DIGITALATISALERT ⌄ | [−] |
| LANDINGAIRPORT | /MQTT/INGRESS/LANDINGAIRPORT ⌄ | [−] |

[+]

| CID | LEFT | LEFT AGG | OPERATION | RIGHT | RIGHT AGG | | |
|---|---|---|---|---|---|---|---|
| 1 | LANDINGAIRPORT | LAST ⌄ | == ⌄ | "KPHX" | | × | [−] |
| 2 | FLIGHTPHASE | LAST ⌄ | == ⌄ | 1 | ⌄ | ⌄ | [−] |
| 3 | FLIGHTPHASE | LAST ⌄ | == ⌄ | 8 | ⌄ | ⌄ | [−] |
| 4 | DIGITALATISALERT | LAST ⌄ | == ⌄ | 1 | ⌄ | ⌄ | [−] |
| 5 | GROUNDSPEED | MAX ⌄ | > ⌄ | 25 | ⌄ | ⌄ | [−] |
| 6 | CID4 | × | AND ⌄ | CID5 | × | ⌄ | [−] |
| 7 | CID2 | × | OR ⌄ | CID3 | ⌄ | × | [−] |
| 8 | CID1 | ⌄ | AND ⌄ | CID7 | × | ⌄ | [−] |

| | |
|---|---|
| DEVICES | DEVICES / RASPBERRY PI / APPLICATIONS / SOP MONITOR - (FFT) [RUNNING] [×CLOSE] |
| OVERVIEW | |
| INGRESS | APPLICATION TITLE |
| RULES | SOP MONITOR |
| APPLICATION | INPUTS / OUTPUTS |
| EGRESS | SERIES [FLOAT] (?) / FFT_OUT [STRING] (?) |
| | /INGRESS/MQTT/SERIES ▽ / /APPLICATION/FFT/FFT_OUT |
| LOGOUT | VARIABLES |
| | INTERVAL [FLOAT] |
| | 1 [SEC] □ |
| | TIME_FORMAT [STRING] |
| | %Y-%m-%dT%H:%M:%S.%f |
| | WINDOW_LENGTH [FLOAT] |
| | 5 [SEC] □ |
| | [STOP] [🗑 DELETE] [💾 SAVE] |
| | APP STATUS: RUNNING |

SYSTEMS AND METHODS OF SITUATION AWARE EDGE ANALYTICS FRAMEWORK FOR AVIONICS IOT GATEWAYS

RELATED APPLICATION

This application claims the benefit of priority to Indian Provisional Application No. 202141027172, filed Jun. 17, 2021, which is incorporated herein by reference in its entirety

TECHNICAL FIELD

Various embodiments of the present disclosure relate generally to Industrial Internet of Things (IIoT) systems and networks. More specifically, this disclosure relates to an adaptive edge platform for use in an IIoT system or network.

BACKGROUND

Industrial process control and automation systems are routinely used to automate large or complex industrial processes. These systems have evolved from closed proprietary systems in the early 1990s to more convenient, connected, and open systems now. The current trend involves (i) moving these systems to cloud computing environments and (ii) using Industrial Internet of things (IIoT) devices within these systems. In some conventional systems, IIoT edge nodes are fixed and are not aware of their situation or the context in which they are used. As a result, as input data patterns change, software for the edge nodes often needs to be manually changed. This leads to inefficiency, substantial manual effort, high maintenance costs, and equipment down-time.

In today's internet of things (IoT) world, IoT providers direct their focus towards connecting devices, extracting data from those devices, and sending the data to the cloud for analytics. A few solutions are available for analytics capabilities at the edge node layers to address the problems of real-time analytics in an industrial internet of things (IIoT) environment. However, solutions may incur heavy bandwidth utilization in sending data to the cloud for analytics.

Data analytics in the avionics domain has typically been restricted to post-flight analysis and inference generation due to inaccessibility of data during the flight. Aside from data that is sent over an Aircraft Communications Addressing and Reporting System (ACARS) network for engine analytics, most post-flight analysis relies on recorded flight data that is limited due to storage and connectivity restrictions. The insights generated as part of the analysis may take days before being incorporated in routine operations leading to in-efficiencies or safety anomalies persisting in subsequent flights. A delay in detection of an equipment fault or pilot deviation from standard operating procedure (SOP) can be catastrophic if not addressed immediately. Even for non-safety critical anomalies, the delay in detection can lead to in-efficient fuel consumption and degradation of overall operational efficiency.

Embodiments of the present disclosure provide context-based adaptive deployment of functionality, including analytics, in an IIoT edge node. One or more embodiments may add intelligence to the edge platform to allow it to adapt to the environment in which it is operating or will be operating. Thus, the architecture of the edge node may be adaptable to the context of the environment where the system performs.

The present disclosure is directed to overcoming one or more of these above-referenced challenges.

SUMMARY OF THE DISCLOSURE

According to certain aspects of the disclosure, systems and methods are disclosed for configuring an Internet of Things (IoT) edge node in an IIoT network and/or an Aerospace Internet of Things (AIoT) network perform one or more functions.

For instance, a method may include receiving, at an edge device from an external server, a rules database comprising a set of rules; receiving, by the edge device, first data from at least one device; processing, by the edge device, the received first data by comparing the received data to each rule among the set of rules; identifying a first triggering event in response to detecting a match between the received data and a rule of the rules database; and outputting an alert corresponding to the first triggering event.

A system may include at least one memory storing instructions; and at least one processor executing the instructions to perform a process including: receiving, at an edge device from an external server, a rules database comprising a set of rules; receiving, by the edge device, first data from at least one device; processing, by the edge device, the received first data by comparing the received data to each rule among the set of rules; identifying a first triggering event in response to detecting a match between the received data and a rule of the rules database; and outputting an alert corresponding to the first triggering event.

A non-transitory computer-readable medium storing instructions that, when executed by a processor, cause the processor to perform a method, the method including: receiving, at an edge device from an external server, a rules database comprising a set of rules; receiving, by the edge device, first data from at least one device; processing, by the edge device, the received first data by comparing the received data to each rule among the set of rules; identifying a first triggering event in response to detecting a match between the received data and a rule of the rules database; and outputting an alert corresponding to the first triggering event.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 depicts an exemplary table describing components that are part of the edge SDK run time, according to one or more embodiments.

FIGS. 17-23 depict various exemplary graphical user interfaces for inputting the rules in the rules engine and displaying system status.

DETAILED DESCRIPTION OF EMBODIMENTS

Figure 1:
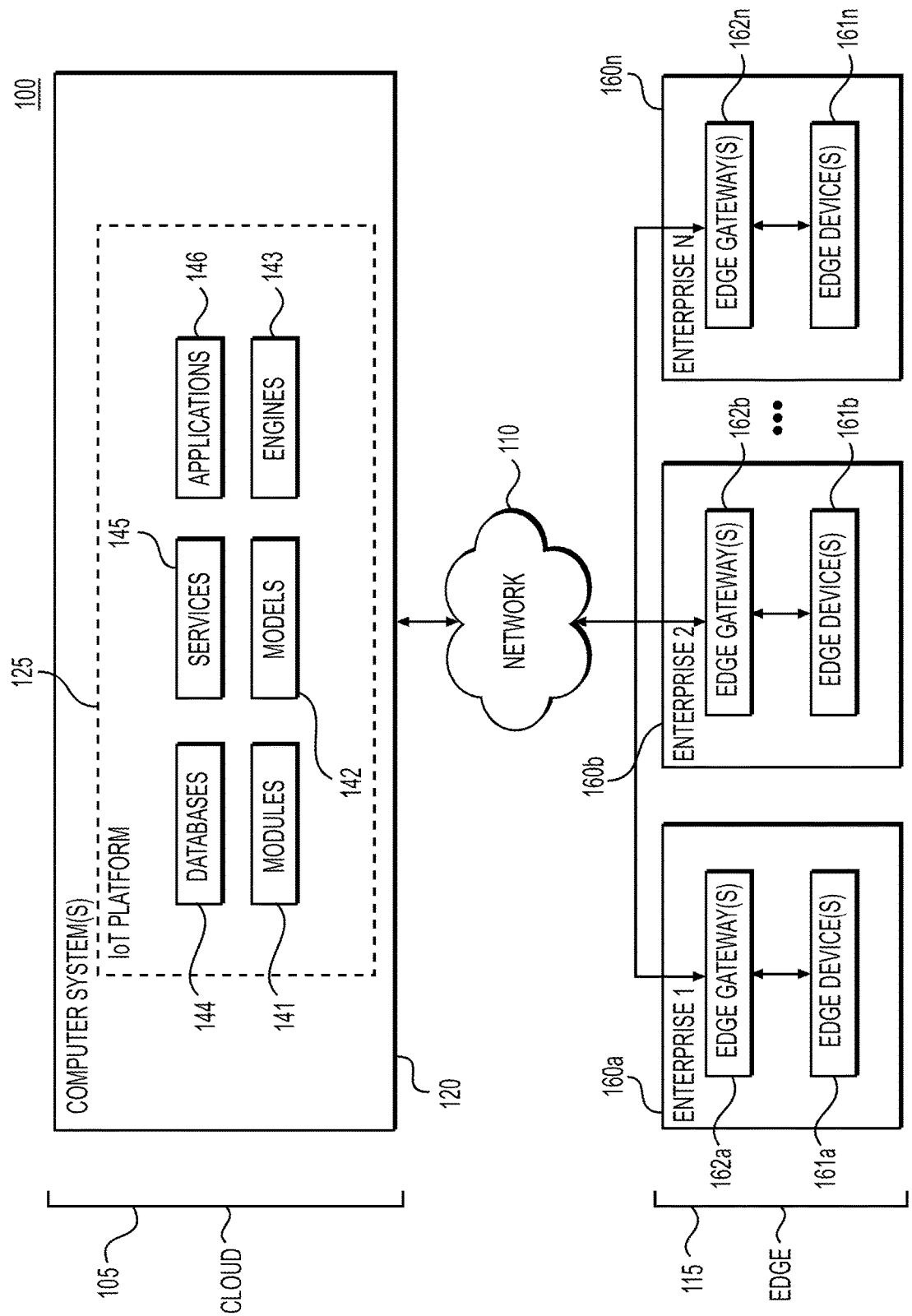
FIG. 1 depicts an exemplary networked computing system environment, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Various embodiments of the present disclosure relate to systems and methods of an edge analytics framework to provide an intelligent software development kit (SDK) which will help users realize the edge inferences on board avionics systems and other systems near to the data source, and aid in decision making (e.g., rule based and/or autonomous) using an end-to-end reference architecture for achieving various benefits around increased efficiency and safety in real-time Some limitations in existing cloud-based intelligence for onboard avionics applications may include: an aircraft produces a large amount of data for a long-haul flight (e.g., 45 TB of data); in a business and general aviation (BGA) segment, an aircraft will have less than 40% of continued internet up time between an end to end flight; the level B or C onboard avionics systems have deterministic compute power for advanced use cases; artificial intelligence (AI) applications in avionics are currently limited for post flight analytics over limited domain use cases around flight efficiency, maintenance and safety; storage may be limited and expensive on onboard systems.

The above limitations may result in the following problems and/or disadvantages: cost involved in the lift and shift/storage of Aerospace Internet of Things (AIoT) onboard edge data to the cloud; taking real-time decisions closer to the data source on board avionics systems for increased efficiency and safety; taking better decisions when the aircraft is not connected to the cloud; facing the advent of AIoT and proliferation of massive amount of data through onboard avionics connected devices; availability of predictive and real-time intelligence for onboard avionics devices; adoption of edge analytics increases scalability and caters for a fault tolerant system with two tiers of processing; seamless integration between intelligent cloud & intelligent edge.

One or more embodiments of the present disclosure provide systems and methods of a novel edge analytics framework to provide an intelligent software development kit which will help the users realize the edge inferences on board the Avionics systems near to the data source and aid in decision making (rule based or autonomous) using an end to end reference architecture for achieving various benefits around increased efficiency and safety in real-time.

One or more embodiments of the present disclosure may provide the following benefits and/or advantages: process device-generated data in real-time (e.g., filter, aggregate, rules, transformation, analyze, predict, detect anomalies); limit data sent to cloud (e.g., aggregated data, anomalies); scalable solution that runs on different target platforms; improve performance requirements (e.g., data ingress, response time); improve quality of service (e.g., manageability, upgradability, security).

Inflight real-time analytics, if done through a cloud infrastructure, call for an expensive SATCOM link where the cost for pushing the data through the pipe is huge. It should be done on the edge close to the data source as much as possible, with size of the analytics being dependent on the compute, storage, and memory limitations. With several smart and very highly capable devices in the form of gateways and edge nodes, it forms for a great use case. Also, the cost of cloud computing can be reduced.

Being deployed as a framework has advantages of having the flexibility to be hosted on third party devices. The SDK methodology and approach also provide the ability for users to develop their own applications on it and become a software service which can be monetized via license or subscription. One or more embodiments of the present disclosure provide a distributed computing system for aerospace which enables the commercial technologies like artificial intelligence (AI), machine learning (ML), etc., to enable aerospace applications.

One or more embodiments of the present disclosure provide an IoT platform with the appropriate edge analytics SDK components and reuse a cloud infrastructure for the server-side IoT operations and reports.

One or more embodiments of the present disclosure may provide the following benefits and/or advantages: provide for a framework for edge analytics for aerospace systems and sub systems where provisioned; easily deployable and maintainable analytics framework; provision for "model on the cloud" and "run on the edge" with all cyber considerations for airborne systems; provision for minimizing attack surface by ensuring that edge computing hardware, applications and data are as per the security assurance levels; provision for running aerospace applications on the framework envisioned; bring AI/ML into the cockpit to harness cockpit data and provide real-time insights; improve the situational awareness in flight deck while in a connected state or non-connected state; push data management, data governance and automation of data rich applications at the edge; help original equipment manufacturers (OEMs) and operators relook into their connectivity and data strategies for maximizing benefits and reducing costs; promote use of commercially available off-the-shelf (COTS) and open source for quicker turn around in this market space; and/or provision for scalable deployment solutions which can be orchestrated locally.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form an Internet-of-Things (IoT) platform 125. It should be appreciated that IoT platform may describe a platform connecting any type of Internet-connected device, and should not be construed as limiting the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a (e.g., edge node), a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
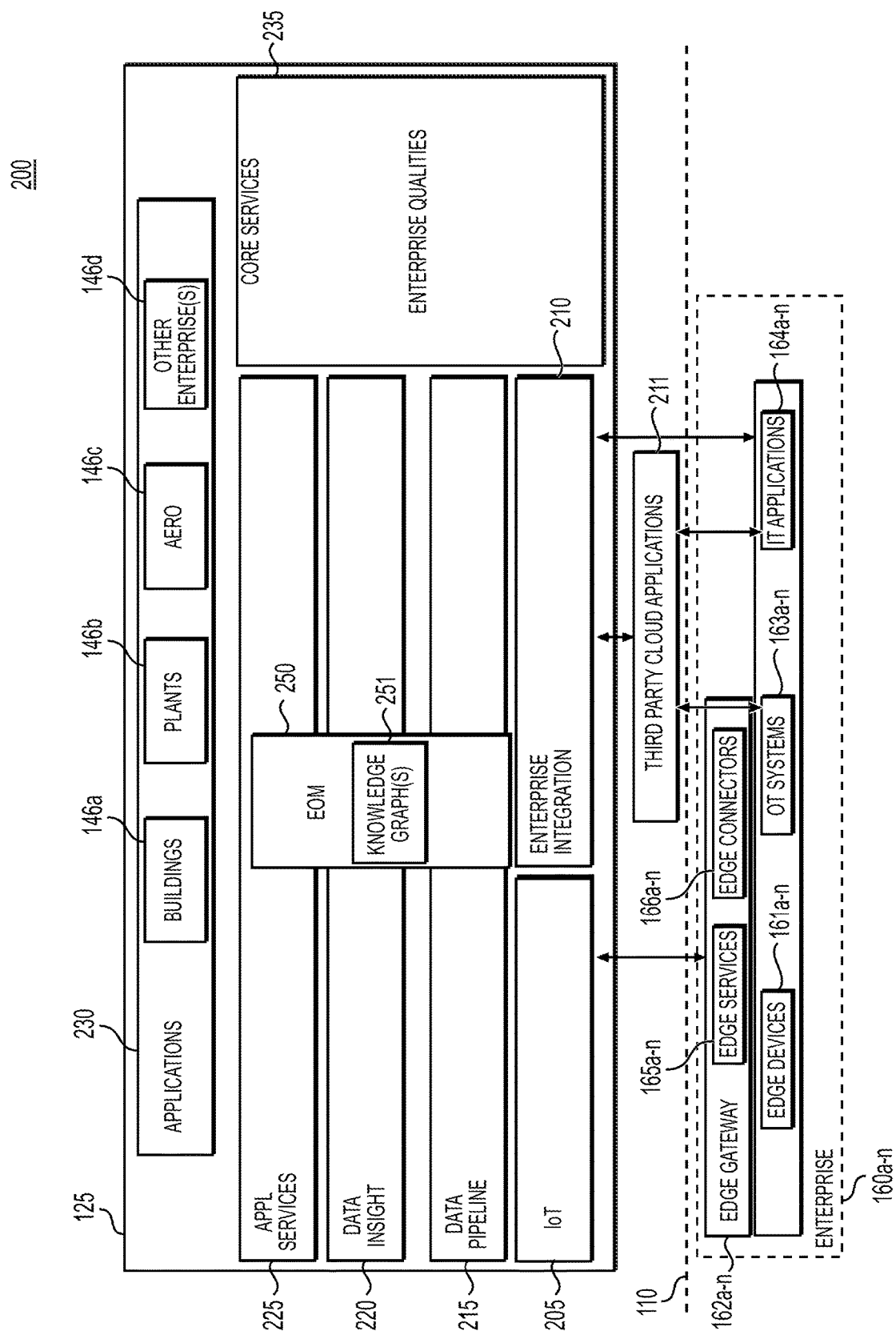
FIG. 2 depicts a schematic block diagram of a framework of an IoT platform of the networked computing system environment of FIG. 1.

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161*a*-161*n* may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161*a*-161*n* includes, or is otherwise in communication with, one or more controllers for selectively controlling a respective edge device 161*a*-161*n* and/or for sending/receiving information between the edge devices 161*a*-161*n* and the cloud 105 via network 110. With reference to FIG. 2, the edge 115 may also include operational technology (OT) systems 163*a*-163*n* and information technology (IT) applications 164*a*-164*n* of each enterprise 161*a*-161*n*. The OT systems 163*a*-163*n* include hardware and software for detecting and/or causing a change, through the direct monitoring and/or control of industrial equipment (e.g., edge devices 161*a*-161*n*), assets, processes, and/or events. The IT applications 164*a*-164*n* includes network, storage, and computing resources for the generation, management, storage, and delivery of data throughout and between organizations.

The edge gateways 162*a*-162*n* include devices for facilitating communication between the edge devices 161*a*-161*n* and the cloud 105 via network 110. For example, the edge gateways 162*a*-162*n* include one or more communication interfaces for communicating with the edge devices 161*a*-161*n* and for communicating with the cloud 105 via network 110. The communication interfaces of the edge gateways 162*a*-162*n* may include one or more cellular radios, Bluetooth, WiFi, near-field communication radios, Ethernet, or other appropriate communication devices for transmitting and receiving information. Multiple communication interfaces may be included in each gateway 162*a*-162*n* for providing multiple forms of communication between the edge devices 161*a*-161*n*, the gateways 162*a*-162*n*, and the cloud 105 via network 110. For example, communication may be achieved with the edge devices 161*a*-161*n* and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162*a*-162*n* may also include a processor and memory for storing and executing program instructions to facilitate data processing. For example, the edge gateways 162*a*-162*n* can be configured to receive data from the edge devices 161*a*-161*n* and process the data prior to sending the data to the cloud 105. Accordingly, the edge gateways 162*a*-162*n* may include one or more software modules or components for providing data processing services and/or other services or methods of the present disclosure. With reference to FIG. 2, each edge gateway 162*a*-162*n* includes edge services 165*a*-165*n* and edge connectors 166*a*-166*n*. The edge services 165*a*-165*n* may include hardware and software components for processing the data from the edge devices 161*a*-161*n*. The edge connectors 166*a*-166*n* may include hardware and software components for facilitating communication between the edge gateway 162*a*-162*n* and the cloud 105 via network 110, as detailed above. In some cases, any of edge devices 161*a*-*n*, edge connectors 166*a*-*n*, and edge gateways 162*a*-*n* may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160*a*-160*n*. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160*a*-160*n* using an extensible object model (or "asset model") and knowledge graphs 251 where the equipment (e.g., edge devices 161*a*-161*n*) and processes of the enterprise 160*a*-160*n* are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161*a*-161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a*-161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute may be configured as a static value (e.g., capacity is 1000 BPH) and/or with a reference to a time series tag that provides the value. The knowledge graph 250 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, the knowledge graph 250 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 250 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party cloud applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins may also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template may define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what the best maintenance option may be and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

Figure 3:
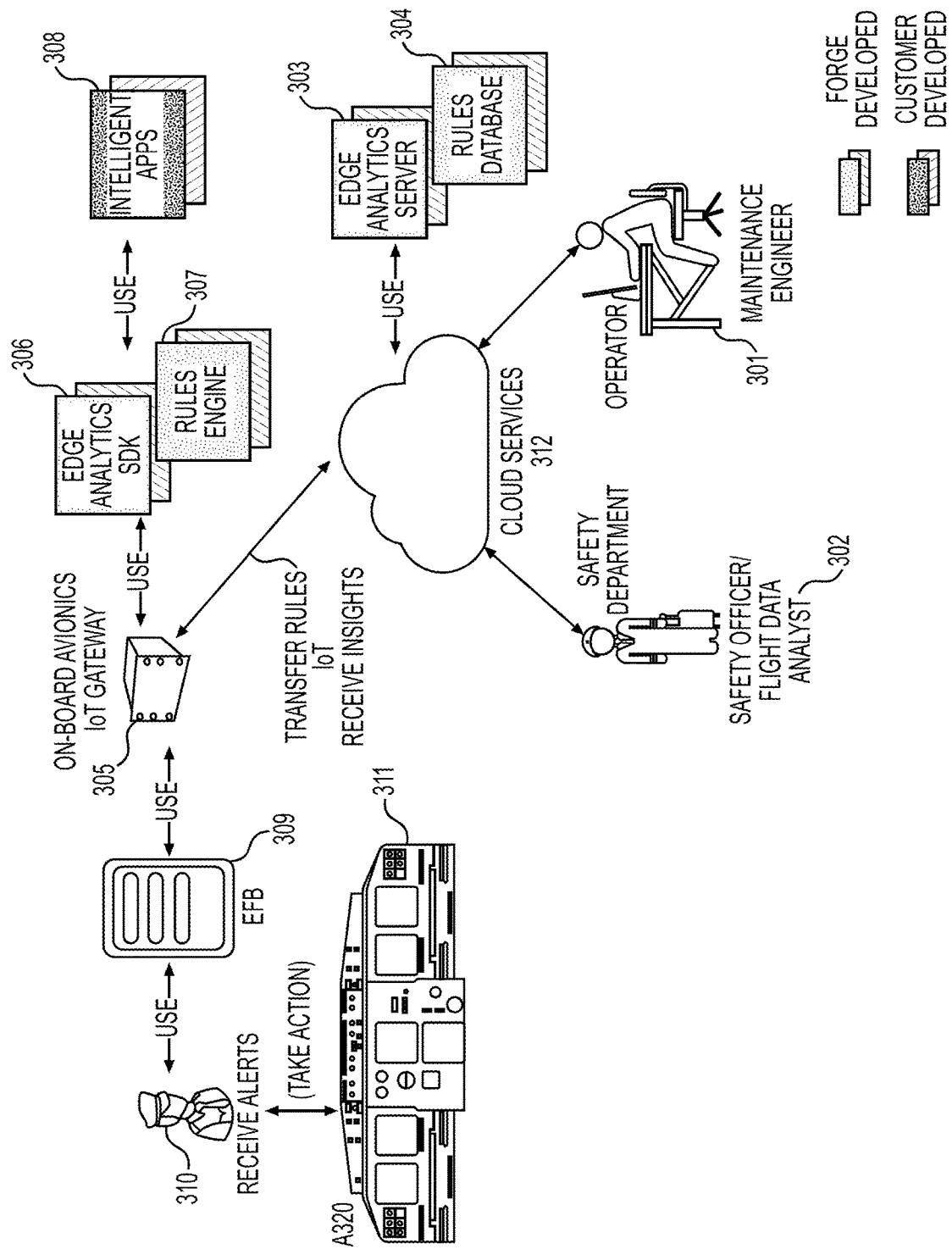
FIG. 3 depicts an exemplary diagram of a data flow, according to one or more embodiments.

FIG. 3 depicts an exemplary diagram of a data flow, according to one or more embodiments. In step 301, an operator may configure rules using a cloud dashboard. In step 302, a safety officer may configure the KPI's in the cloud. In steps 303 and 304, the edge analytics server may pack metadata and send it to edge hardware using IoT platform 125. In step 305, an onboard gateway delivers data to an edge analytics software development kit (SDK). The edge analytics SDK 306 applies the metadata to the rules engine 307. The onboard intelligent applications 308 consume data through SDK and operate over the edge rules. The onboard application 308 may delver an inference to pilot 310 using an electronic flight bag (EFB) 309. An actionable update may then be made to system 311.

Figure 4:
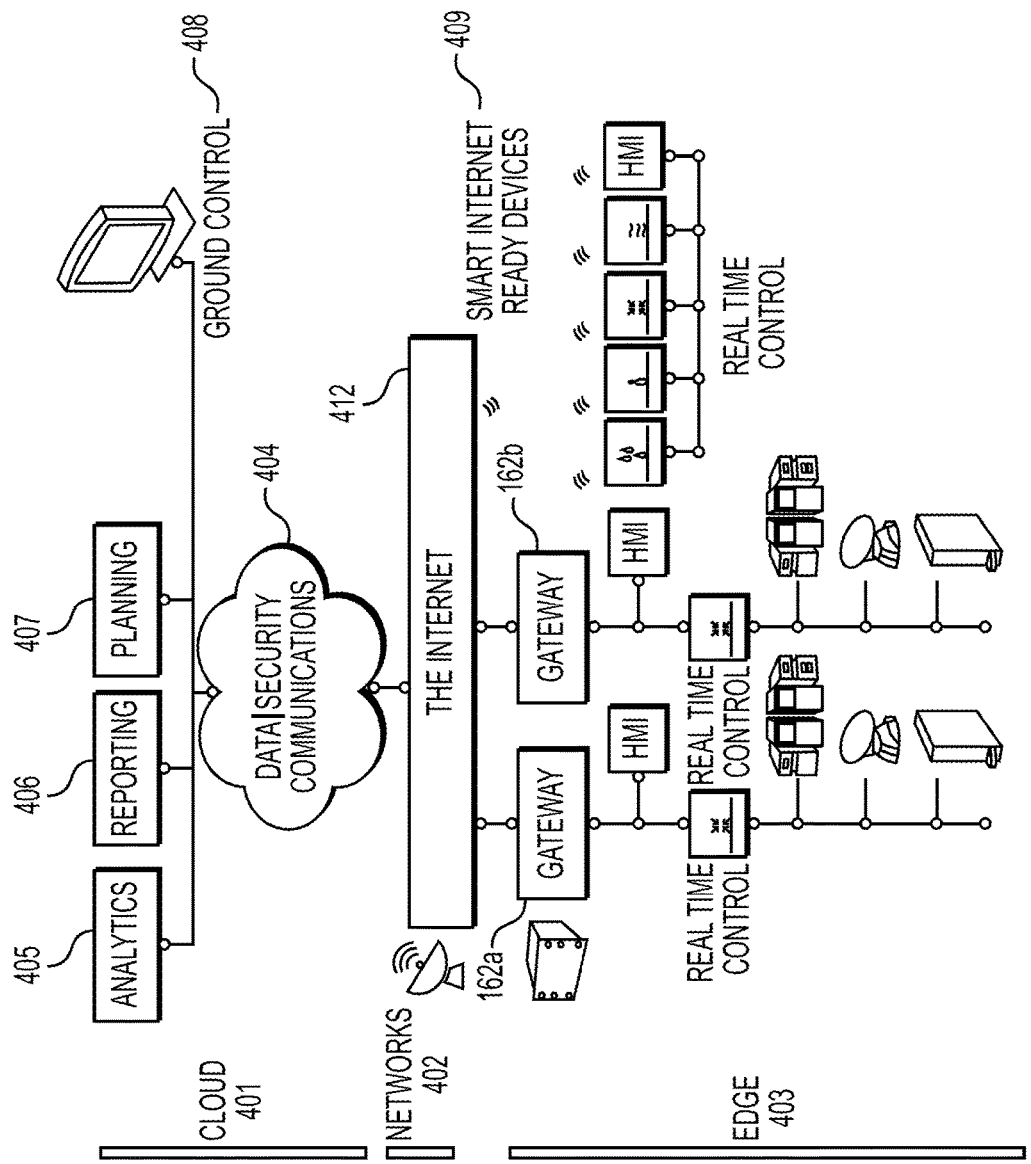
FIG. 4 depicts an exemplary block diagram of an AIoT system, according to one or more embodiments.

FIG. 4 depicts an exemplary block diagram of an AIoT system, according to one or more embodiments. An AIoT system may support three layers (e.g., cloud 401, network 402, and the edge 403), as shown in FIG. 4. In AIoT systems, AIoT providers may direct their focus towards connecting onboard avionics devices, extracting data from those devices, and sending the data to the cloud for analytics with the help of one or more onboard IoT gateways 162a and 162b. The data may be analyzed using analytics 405, reporting 406, and planning 407, and ground control 408. Communication between the edge 403 and cloud 401 may be performed using the Internet 412 and smart int. The Internet may connect to cloud 401, which may include use data and security communications 404. The gateways 162a and 162b may be connected to smart internet ready devices 409.

A connected avionics system may have the data stream injected into AIoT gateways 162a and 162b from multiple onboard avionics subsystems like, flight management system (FMS), enhanced ground proximity warning systems (EGPWS), weather radar, etc. for data transfer to the cloud-based analytics. This method of data analysis may lead to in-consistency and indeterministic results.

With respect to these sub systems, the aerospace industry has multiple use cases where time to respond to certain alert or critical scenarios may be important in the onboard systems. The latency in generation of data and its consumption can have quite a big effect on the impact over timely responses to address the scenario. The data path commute to the Cloud Platform can lead to a huge delay. Deterministic networks and processing may also when the system should behave like a clock but is not guaranteed for a SATCOM, ATG, 5G, Wi-Fi>IOT data ingestion>running the data through a service>pushing data back for consumption. These solutions incur heavy bandwidth utilization in sending data to the cloud for analytics. It may also not be favorable for real-time decision-making aids or use cases where latency matters.

Existing cloud based analytics in avionics may have problems such as cost involved in the lift and shift/storage of AIoT onboard edge data (e.g., gigabytes (GBs)/Flight) to the cloud; latency in generation of data and its consumption due to size of data and bandwidth restrictions; loss of connectivity during the flight due to satellite coverage; indeterministic time response for real-time decision support systems; and/or lack of tail based prediction capability in cloud-based analytics.

One or more embodiments of the present disclosure address the above problems and are able to provide reliable real-time decision support systems by developing a method for providing analytics on-premise. The present disclosure describes at least one method of a customizable rules engine which may be processed during the flight for applications related to flight safety, efficiency and maintenance.

In existing cloud-based analytics rules will be applied on the data once it reaches cloud. The rules are fixed and static in nature. As the scenarios keep changing at the edge, it is useful to have the framework supporting for dynamic rule updates.

One or more embodiments of the present disclosure provide a rules engine, which is one of the components in an edge analytics framework, which allows to modify the rules as and when required. The framework may provide the GUI through which the rules can be updated for the applications running at the edge. This enables efficient data filtering at edge where patterns of incoming data are dynamic in nature. It not only helps in reducing the quantity of data but also ensures the quality of data being pushed to the cloud.

A rules engine may be used as a framework for building event-based workflows. The rules engine may include one or more of three main components: a message component, e.g., any incoming event; a rules node; and/or a rules chain. The message may refer to incoming data from devices, device life-cycle event, REST API event, RPC request, etc. The rules node may be a function that would be executed on an incoming message. There are many different node types that can filter, transform, and/bluor execute some action on incoming message; The rules chain may be nodes relate to each other with relations, so the outbound message from rule node is sent to next connected rule nodes.

The rules engine may be a highly customizable framework for complex event processing. Below are some common use cases for configuring rule chains: data validation and modification for incoming telemetry or attributes before saving to the database; copy telemetry or attributes from devices to related assets so you can aggregate telemetry, e.g., data from multiple avionics subsystems can be aggregated in related asset; create/update/clear alarms based on defined conditions; trigger actions based on edge life-cycle events, e.g., create alerts if device is online/offline; load additional data required for processing, e.g., load temperature threshold value for a device that is defined in device's customer or tenant attribute; trigger REST API calls to external systems; raise alarms/alerts when complex event occurs and use attributes of other entities inside email template; and/or consider user preferences during event processing.

Exemplary embodiments of the present disclosure provide systems and methods of an edge analytics software development kit (SDK) framework using an avionics application developers can build rapid applications which can operate on the on-board avionics subsystem data to generate various inferences in real-time in the cockpit. A feature of the onboard avionics edge analytics framework is to build at the cloud and run at the edge.

The SDK offers various features including data ingestion from the avionics systems through MQTT and real-time streaming, a rules engine, a time series database, a data pipeline for message exchange, and/or command and control. The platform SDK enables avionics app developers to write time series analytics applications as well as re-use analytics models that are trained in the Aerospace IoT Platform Cloud. The SDK also supports the execution of rules specified for the rule's engine running as part of the IoT platform real-time analytics, with certain restrictions.

Edge analytics framework SDK may support the execution of the following analytical models against the live data stream in the target device platform: time series models; and rules and expression configured on cloud server.

According to one or more embodiments, an edge analytics framework SDK may support functionalities such as: ability to register and configure the devices that are going to send data into the edge node; ability to view, create, replace, update and delete rules in the server console; ability to view the results/notifications from the edge analytics applications on the edge nodes; support MQTT, CoAP and similar messaging protocol communication with devices in order to ingest data; ability to run a rules engine that executes rules written for the avionics rules engine running on an IoT Platform as part of the real-time streaming analytics capability; support for basic functionality of an analytics engine as well as the ability to train an avionics model on the cloud and run it on the edge; an advanced capability of the SDK to support the runtime alone; processing data from multiple real-time data streams; the size complexity of the complex event processing (CEP) engine should be configurable; writing analytics application(s) to process real-time data streams; and/or remotely monitoring the health of the solution, administer (e.g., start/stop) the solution and investigate/debug issues.

The edge analytics framework may have the below two sets of functional components: Analytics Manager (e.g., Cloud or Web Server); and/or Edge Analytics Framework SDK (e.g., IIoT Gateways).

FIG. 5 depicts an exemplary table describing components that are part of the edge SDK run time, according to one or more embodiments. As illustrated in FIG. 5, the components may include SDK core, node agent, ingress engine, egress engine, expression engine, and/or analytics runtime.

Operations on the server-side edge analytics management console may include managers services (e.g., on the cloud/server) and node manager (e.g., on the edge).

Managers services may include a graphical user interface (GUI)/dashboard and may be used to create and deploy edge configurations, such as nodes and sensors; analytical expressions edit and compile; data publishers; and/or application (via SDK).

The node manager may manage configurations for protocol agents, data bus, expressions, and data publishers; collect services statistics and performances; applications link; and/or alerts dashboard.

Applications may be implemented using a programming language, e.g., Python, for the basic edition of the SDK and will be deployed on the edge node consuming the edge analytics framework SDK components. Using the Standard SDK capabilities, the analytics app can register to the server console and will get subscribed to the edge data bus or complex event processing (CEP) towards the interested topics using a topic based subscription model.

Figure 6:
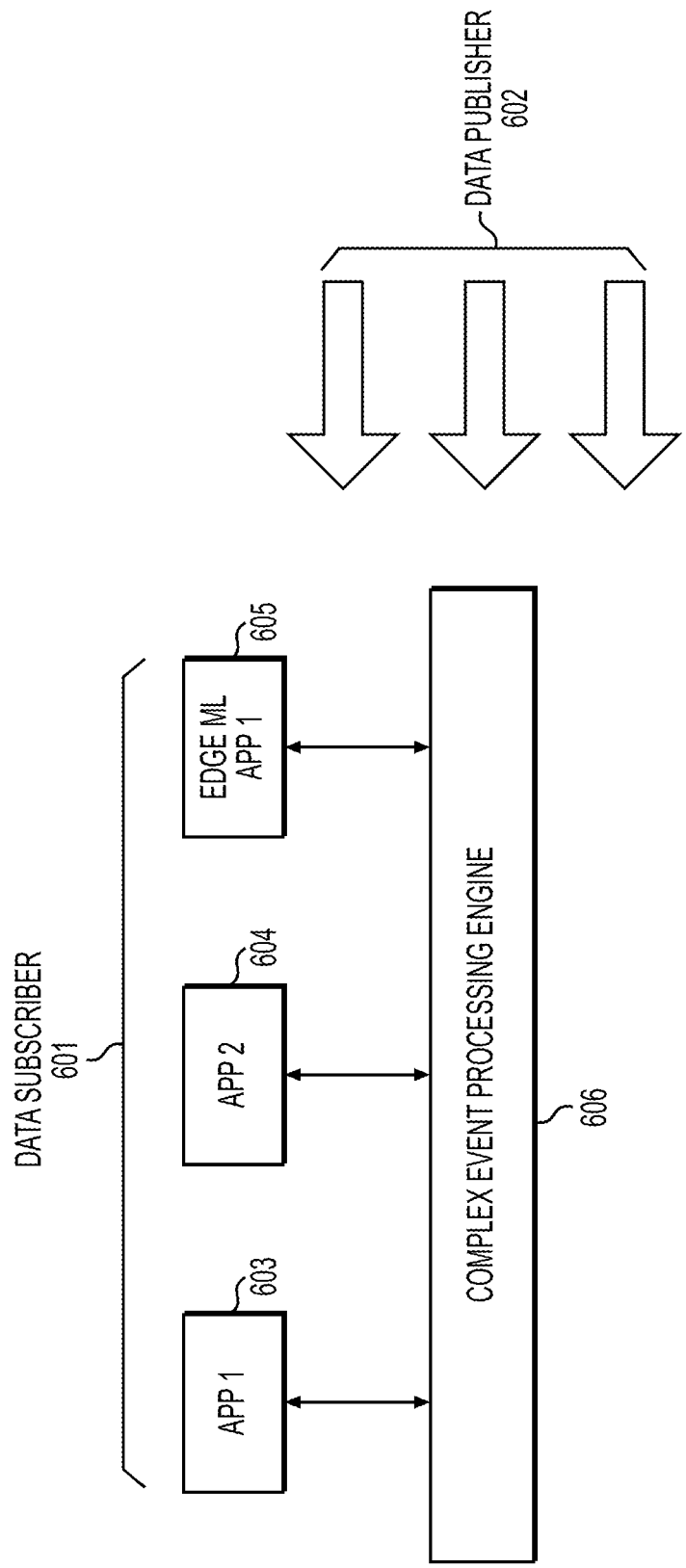
FIG. 6 an example ontology of an application is illustrated, according to one or more embodiments.

According to one or more embodiments, an ontology of the application is illustrated in FIG. 6, and described below. The application may include a data subscriber 601 and a data publisher 602. The data subscriber 601 may include applications 603 and 604, edge ML application 605, and complex event processing engine 606.

The rules engine 307 is a component of the edge analytics framework SDK where the cloud/server defined mathematical rules can be evaluated with the applications against the live data traffic. The edge analytics framework SDK will be having built with a wrapper around standard open source expression engine and integrate this capability with the end to end framework architecture. Applications will need to follow the SDK specification to utilize the rule expressions in their respective application logics.

The rules engine may be implemented with a plug and play (PnP) architecture to attach and/or detach advanced and a proprietary rules engine to support customized targets with minimal resource footprints.

Edge ML application 605 provides advanced edge analytics capability to build complex machine learning models in the cloud using big data and runs them on the edge using the edge analytics ML runtime for advanced requirements.

The following types of ML models may be evaluated in the edge runtime for various inferences: classification models in edge ML; regression models in edge ML; and/or clustering models in edge ML.

Classification models in edge ML may include logistic regression and/or neural network classifier. regression models in edge ML may include linear regression and/or random forest. clustering models in edge ML may include K-means and/or one-class SVM, etc.

The framework SDK may provide runtime for Edge ML and/or lift and shift of edge ML models between the cloud/server manager and the edge node.

Figure 7:
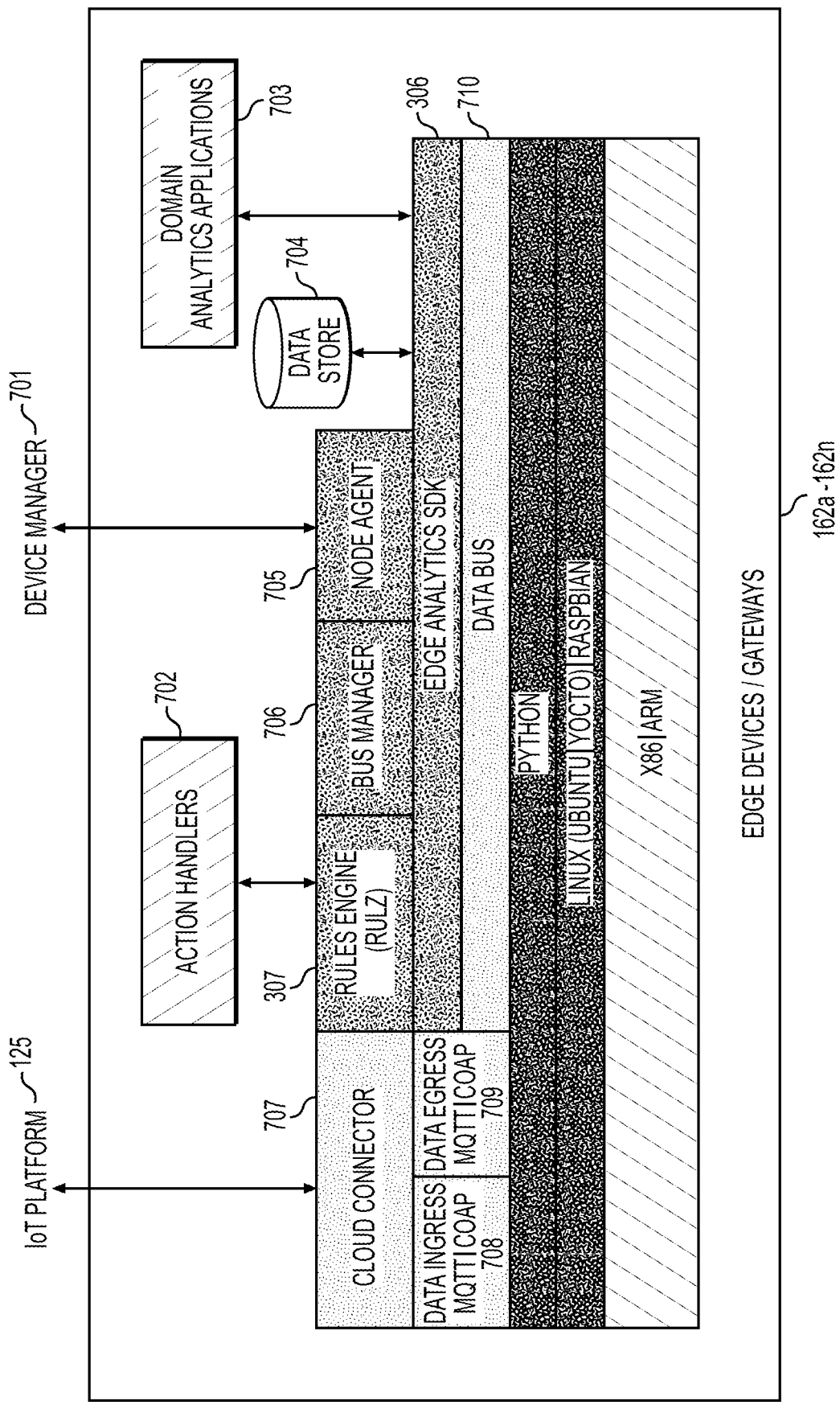
FIG. 7 depicts an exemplary layered view of an edge node in accordance with the edge analytics framework architecture, according to one or more embodiments.

FIG. 7 depicts an exemplary layered view of an edge node in accordance with the edge analytics framework architecture, according to one or more embodiments. As illustrated in FIG. 7, edge devices 162a-162n may connect to a device manager 701 and IoT platform 125. include action handlers 702, domain analytics applications 703, data store 704, node agent 705, bus manager 706, rules engine 307, cloud connector 707, data ingress MQTT/COAP 708, data egress MQTT/COAP 709, data bus 710. The SDK may support python, linux, and/or an x86/ARM processor.

Figure 8:
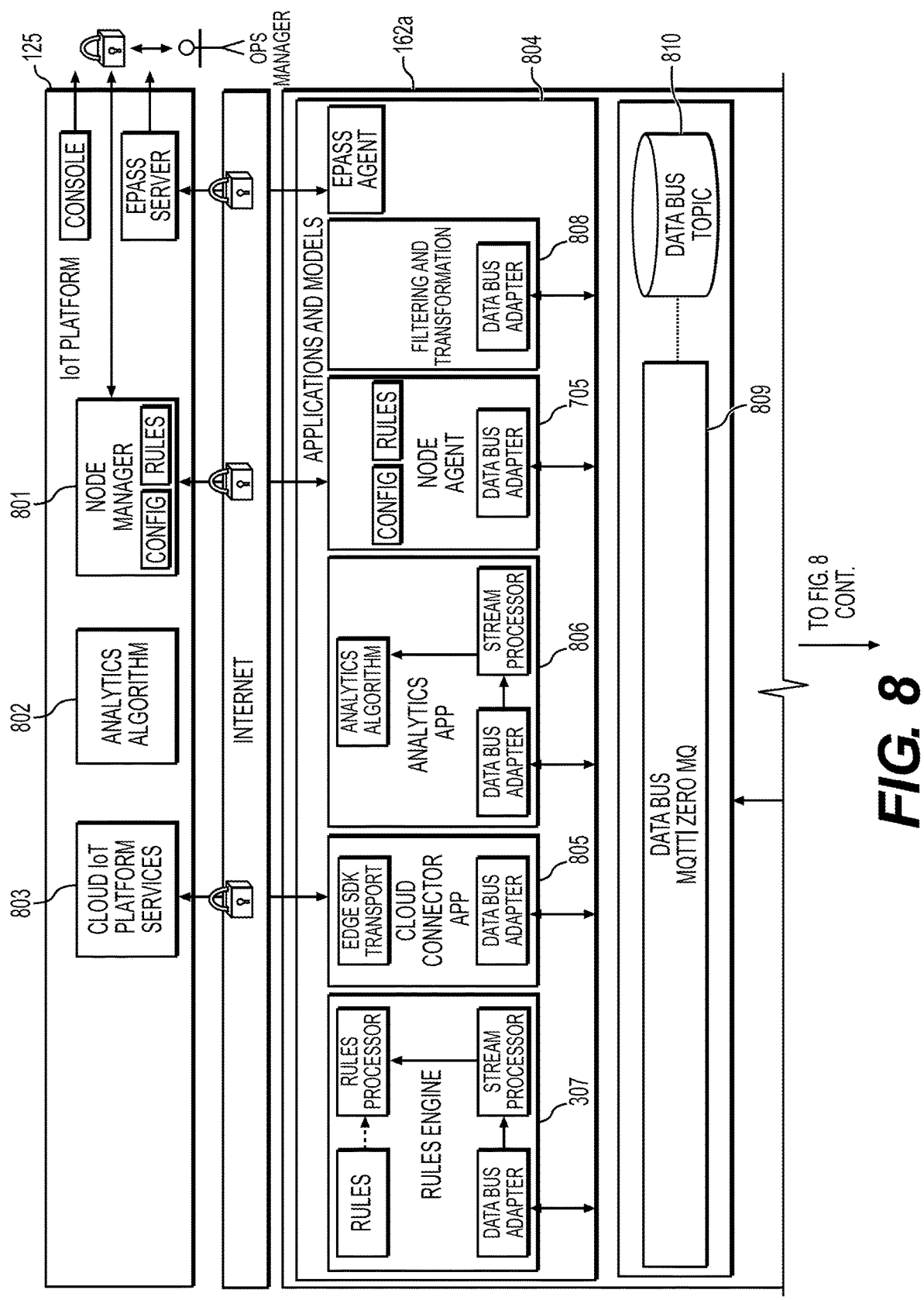
FIG. 8 depicts an exemplary high-level architecture of an edge analytics framework, according to one or more embodiments.
Figure 8:
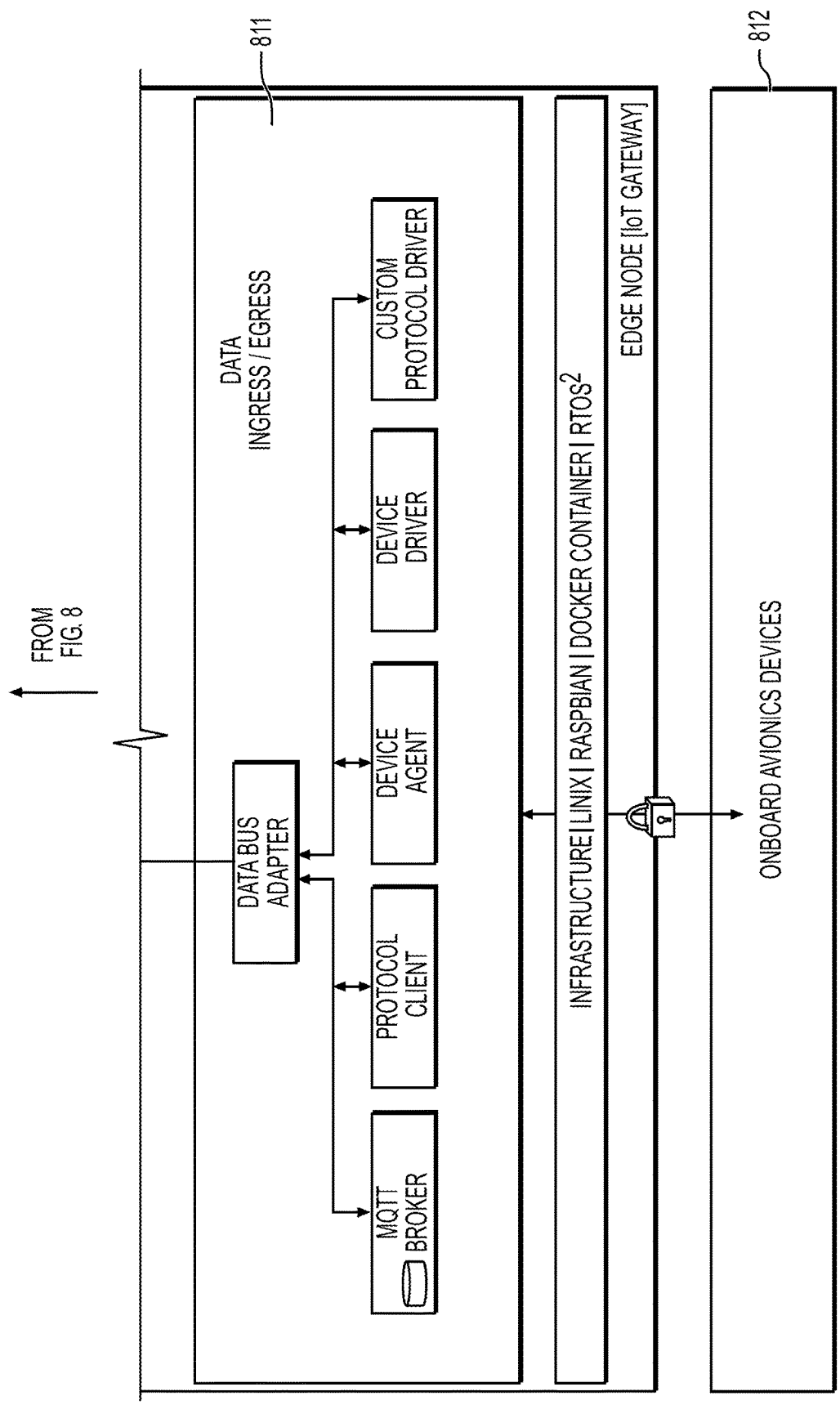

FIG. 8 depicts an exemplary high-level architecture of the edge analytics framework. For example, FIG. 8, depicts the overall vision and design blueprint that may be used to build the SDK components. Components shown in FIG. 8 are described below. The edge node 162a may connect, through the Internet, to IoT platform 125, which may include node manager 801, analytics algorithm 802, cloud IoT platform services 803, console, and/or epass server. Edge node may also connect to onboard avionics devices 812. Analytics applications 806 may perform business logic on data streams. Edge node 162a may include applications and models 804, which may include rules engine 307, cloud connector app 805, analytics app 806, node agent 705, filtering and transformation 808, data ingress/egress 811. Data is received by subscribing to a topic on the data bus. The analytics engine supports complex event processing through the execution of mathematical expressions. By writing a python expression an analytics developer can process data generated by sensors and produce a stream of data that can be shared with applications. According to one or more embodiments, a version of the SDK will support scientific python-based expression runtime. Analytic models may be trained in the cloud, packaged as containers along with the SDK, and communicate with other applications through the databus.

According to one or more embodiments, edge analytics framework SDK provides an MQTT Broker (e.g., Apache Paho). Data ingress may refer to data coming from a publisher (e.g., a sensor) which is sent to an MQTT topic and is made available for other components, e.g., enrichment data ingress.

According to one or more embodiments, a data pipeline may enable data to be shared across applications. Publishing and subscribing to topics is supported, which supports writing loosely coupled applications. A data publisher may be used to write a stream of data to a time series database. A docker engine may support execution of Docker containers in an operating system that supports containers, e.g., Linux. Data ingress/egress configurations as well as analytics expressions are downloaded from the Analytics Manager Console and stored at the edge. An edge manager may be used to configure a node and check the health of the node (e.g., CPU and memory utilization), whether it is connected to the Manager, etc. analytics expressions are developed on the Manager and then deployed on the Edge node. An edge manager agent may communicate with the edge manager. The edge manager agent may provide the health information about the edge node to the manager. The agent may also be used for configuring the node.

Enrichment may include filtering and transforming incoming data, detecting null values, and/or making a stream of data available to various data processing applications. The Software Development Kit (SDK) may enable integration with the databus and facilitates publish/subscribe to topics and manages the analytics applications on the edge node.

According to one or more embodiments, cloud connector 805 is packaged as an application, and may communicate with other applications through the data bus topic 810. For example, cloud connector 805 may: send the heartbeat of the edge to cloud every predetermined interval (e.g., 30 seconds); send the data in form of HistoryUpdateMessage and NewEventMessage; poll data from data bus topic "/analytics/PublishToCloud" and publish to cloud; sent samples can be retrieved from cloud using a time series database, which may include time series data.

Figure 9:
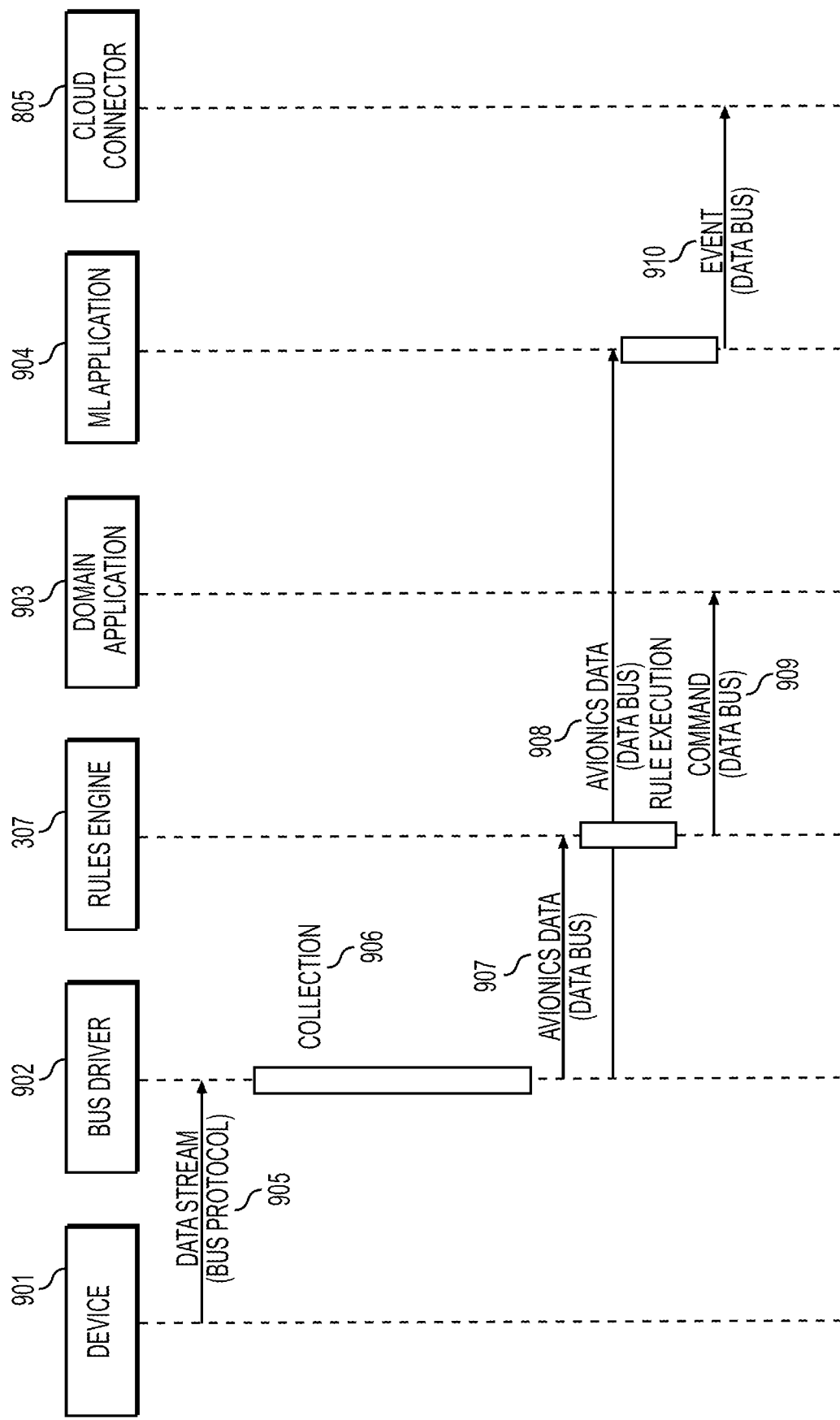
FIG. 9 depicts an exemplary data flow describing the steps in an edge analytics application, according to one or more embodiments.

FIG. 9 depicts an exemplary data flow describing the steps in an edge analytics application that may leverage the edge SDK runtime to perform inferences on the live data traffic. The flow starts with the data publisher (e.g., device 901) which may push data stream 905 on to a bus driver 902 for high-fidelity complex even processing. Bus driver 902 may perform a collection 906, send avionics data 907 to the rules engine 307, and send avionics data 908 to ML application 904. The rules engine 306 may send a command to domain application 903. The analytics ML application 904, which has already subscribed to the interested topic using a topic-based subscription may utilize the rules engine 307 to evaluate a specific analytic rule which is downloaded from the analytics manager on the cloud/server, and derive the appropriate insight from the live data traffic. The ML application 904 may further utilize the cloud connector 805 and/or the edge node notifier component to send back specific alerts (e.g., event 910 to the edge analytics server/manager for the user intervention.

Figure 10:
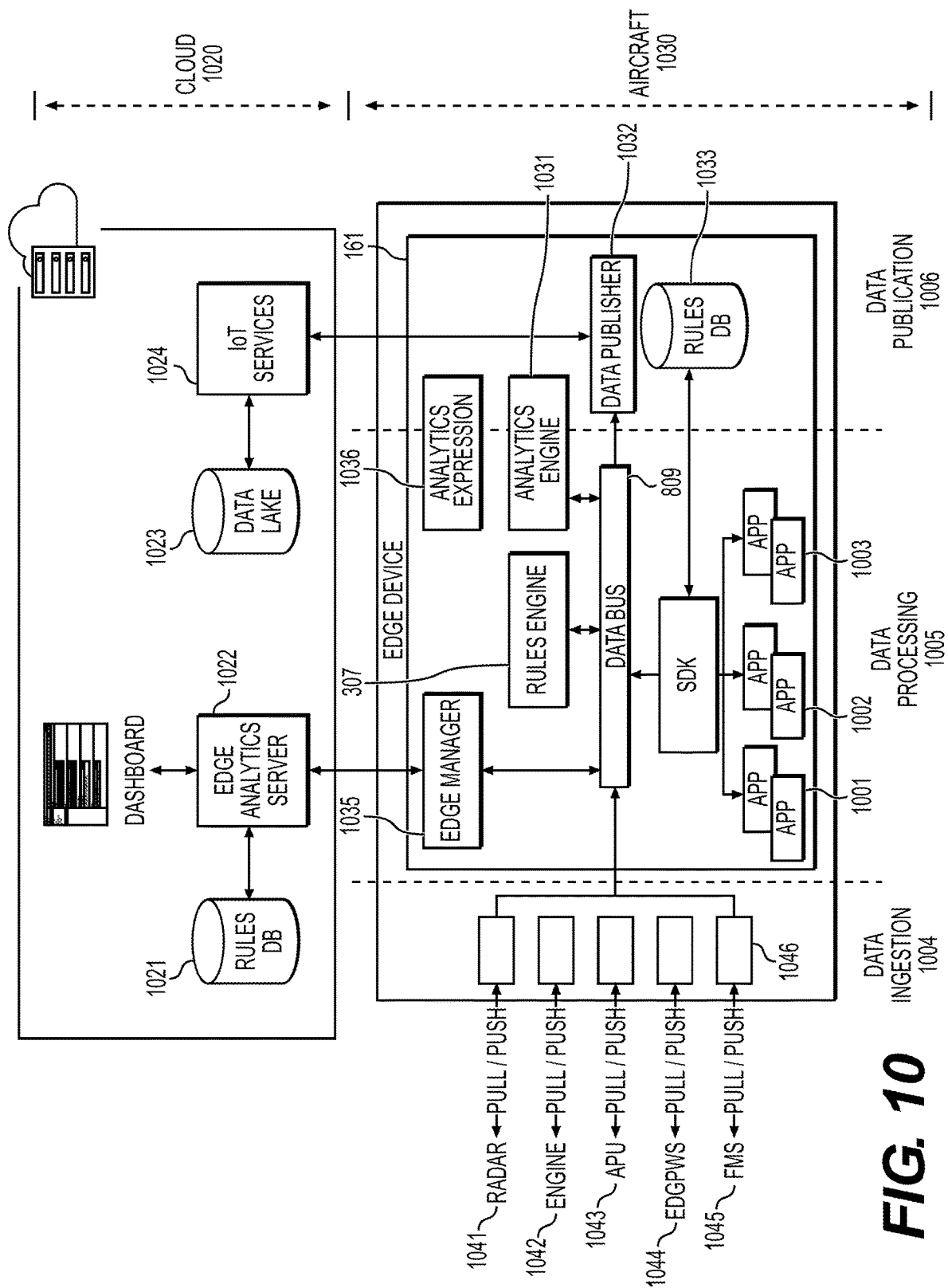
FIG. 10 depicts a diagram of the edge analytics framework, according to one or more embodiments.

FIG. 10 depicts a diagram of the edge analytics framework, according to one or more embodiments. As illustrated in FIG. 10, the edge analytics framework may include services in cloud 1020 and aircraft 1030. The cloud 1020 may include a rules database 1021, edge analytics server 1022, data lake 1023, and IoT services 1024. Edge analytics server 1022 may be connected to a user interface, e.g., dashboard.

According to one or more embodiments, aircraft 1030 may include features for data ingestion 1004, data processing 1005, and data publication 1006. The data ingestion 1004 may include a process 1046 for receiving information from radar 1041, engine 1042, auxiliary power unit (APU) 1043, EGPWS 1044, and/or light management system (FMS) 1045. edge device 161. Edge device 161 may include rules engine 307, edge manager 1035, analytics engine 1031, data publisher 1032, rules database 1033, analytics expression 1036, data bus 809, applications 1001, 1002, and 1003.

Figure 11:
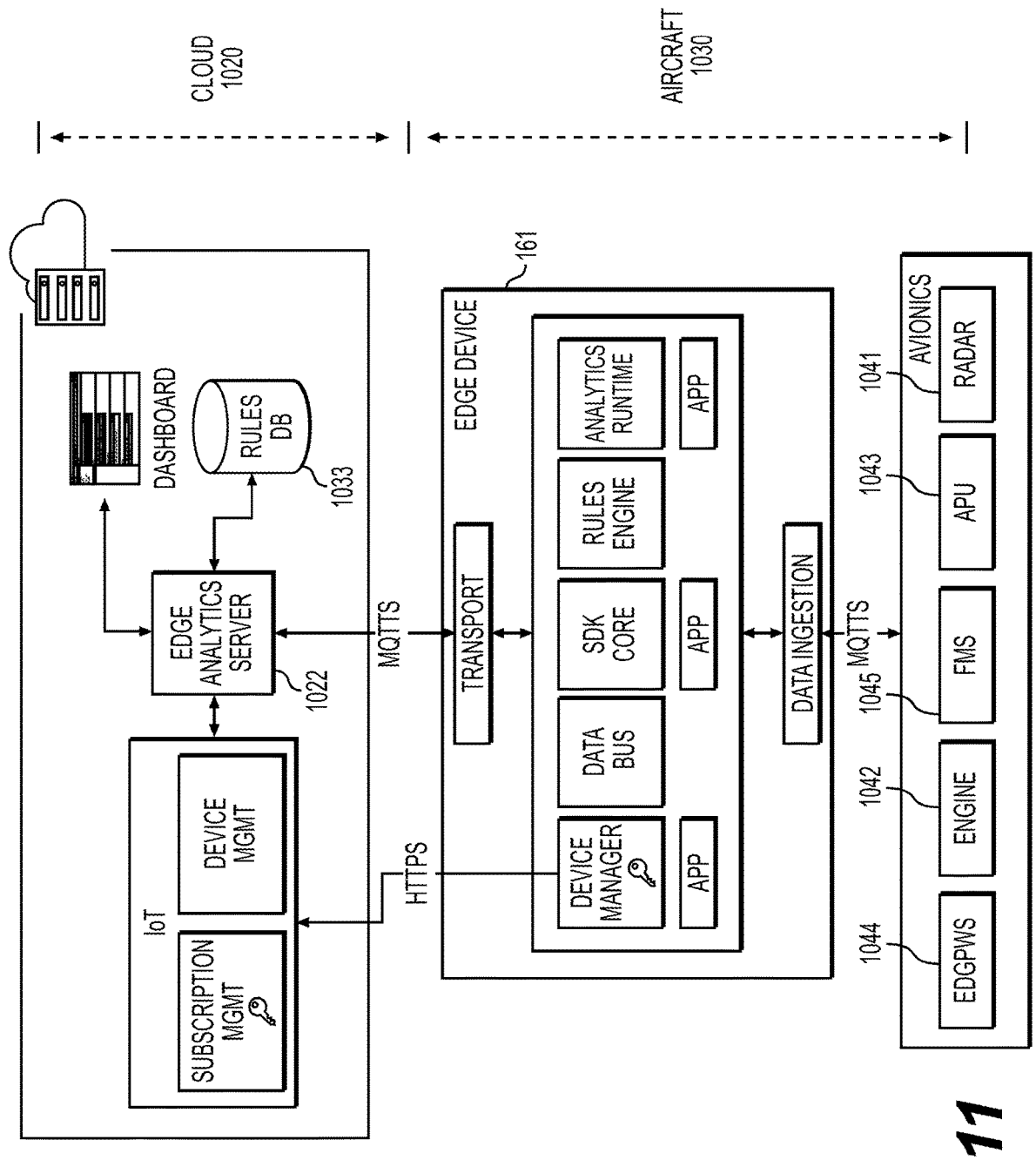
FIG. 11 depicts a diagram of the edge analytics framework, according to one or more embodiments.

FIG. 11 depicts a diagram of the edge analytics framework, according to one or more embodiments. As illustrated in FIG. 11, the edge analytics framework may include services in cloud 1020 and aircraft 1030. The cloud 1020 may include IoT services, including subscription management and device management, edge analytics server 1022, and/or rules database 1033. Edge analytics server 1022 may connected to edge device 161 using MQTTS. IoT services may connect to a device manager of edge device 161 using HTTPS. The data ingestion may include a process for receiving information from radar 1041, engine 1042, auxiliary power unit (APU) 1043, EGPWS 1044, and/or light management system (FMS) 1045.

Figure 12:
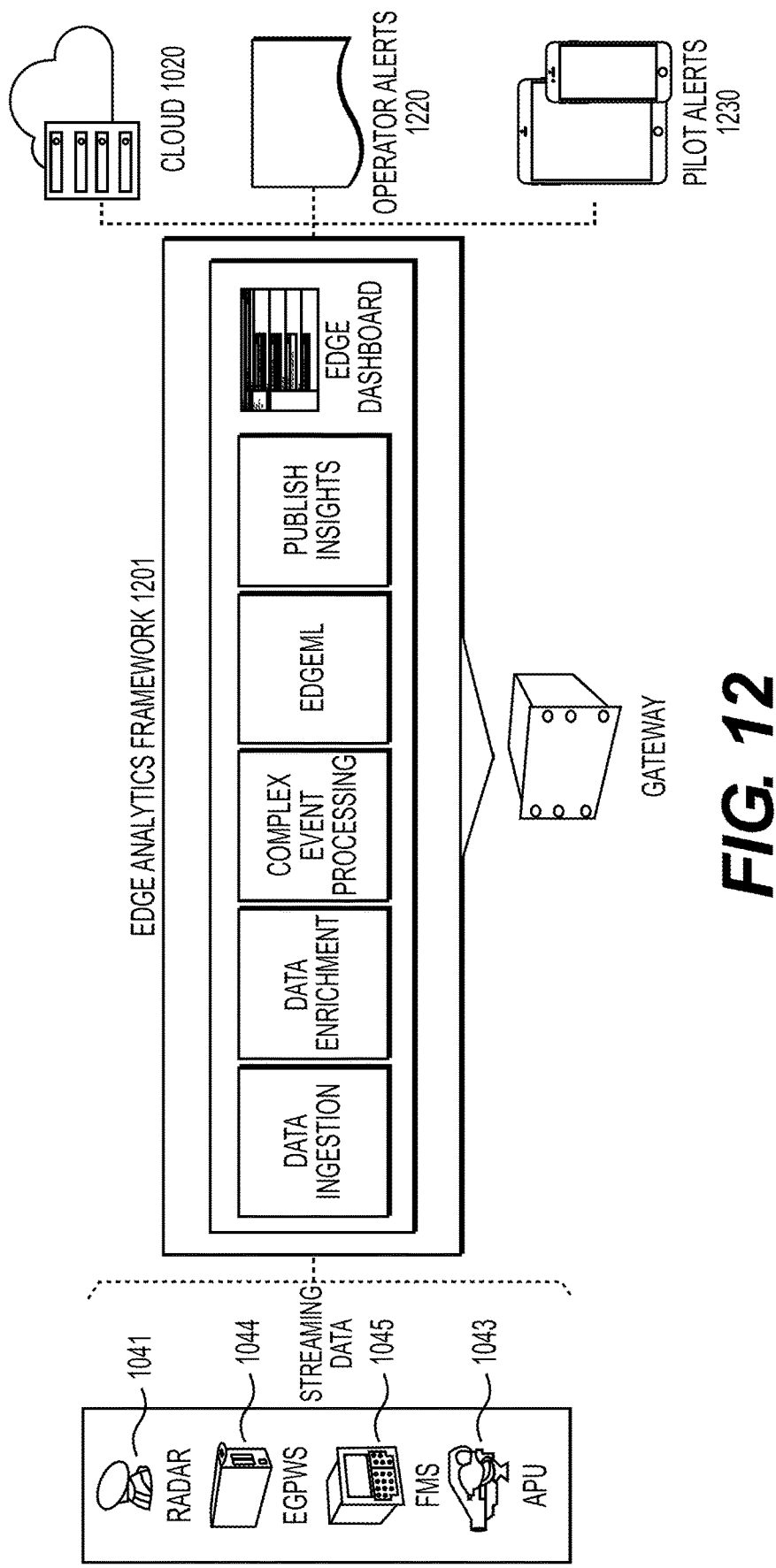
FIG. 12 depicts a diagram of the edge analytics framework, according to one or more embodiments.

FIG. 12 depicts a diagram of the edge analytics framework, according to one or more embodiments. The edge analytics framework 1201 may include one or more processes including data ingestion, data enrichment, complex event processing, EdgeML, and/or publish insights. The edge gateway may receive data including radar 1041, EGPWS 1044, FMS 1045, and/or APU 1043. The gateway may provide operator alerts 1220 and pilot alerts 1230, based on rules engine 307.

Figure 13:
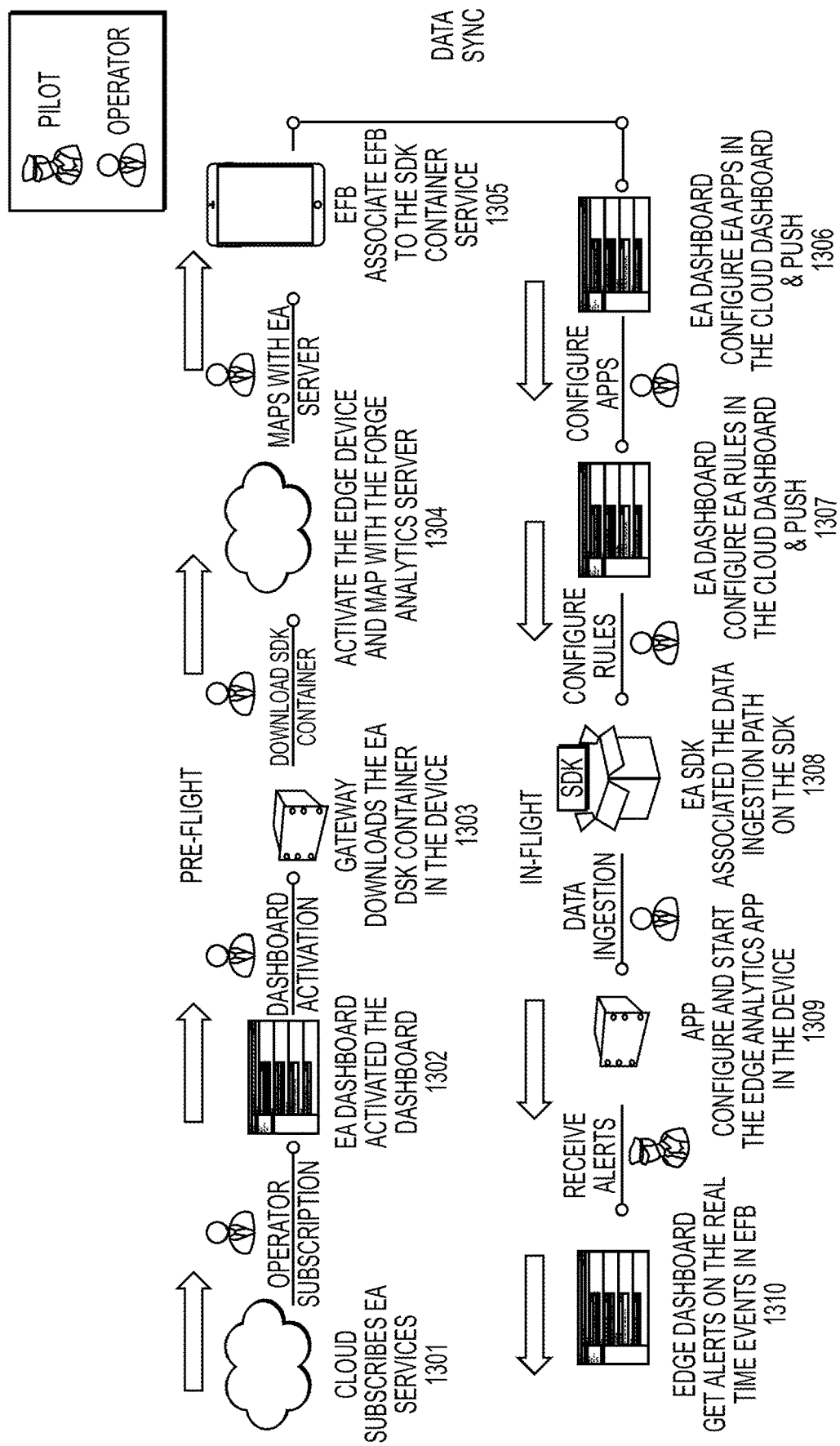
FIG. 13 depicts an exemplary method of providing an edge analytics framework, according to one or more embodiments.

FIG. 13 depicts an exemplary method of providing an edge analytics framework, according to one or more embodiments. As illustrated in FIG. 13, in step 1301, the method may include the cloud subscribing to edge analytic services. In step 1302, the method may include activating an edge analytic dashboard. In step 1303, the method may include downloading, by the edge gateway, the edge analytic SDK container in an edge device. In step 1404, method may include activating the edge device and mapping to the analytics server. In step 1305, the method may include associating an EFB to the SDK container service. In step 1306, the method may include configuring edge analytics apps in the cloud dashboard and pushing to the edge gateway. In step 1307, the method may include configuring edge analytics rules in the cloud dashboard and push to the edge gateway. In step 1308, the method may include associating the data ingestion path on the SDK. In step 1309, the method may include configuring and starting the edge analytics app in the edge device. In step 1310, the method may include receiving alerts based on real-time events in the EFB.

Figure 14:
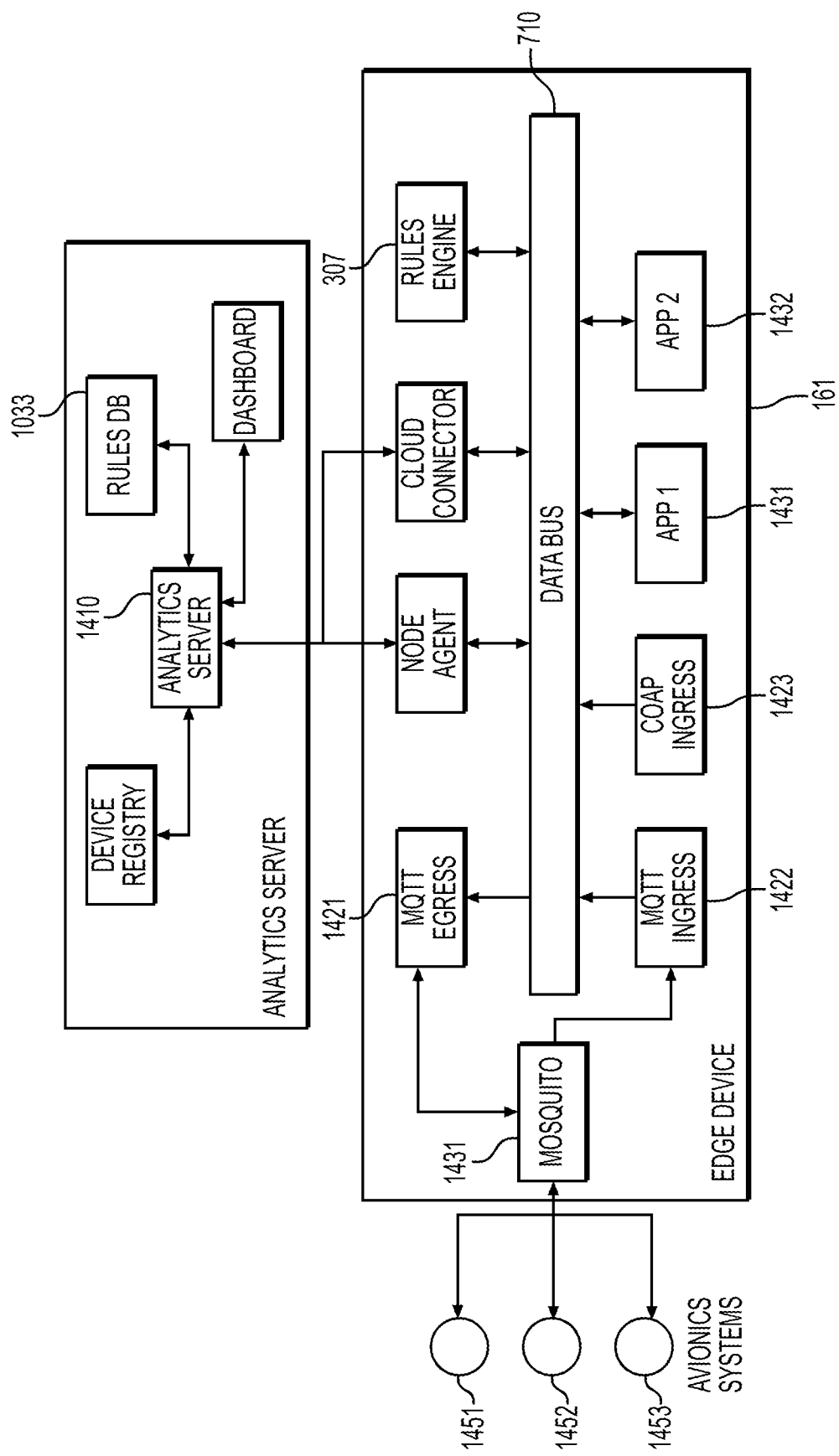
FIG. 14 depicts a diagram of the edge analytics framework, according to one or more embodiments.

FIG. 14 depicts a diagram of the edge analytics framework, according to one or more embodiments. Edge device 161 may include data bus 710, rules engine 307, cloud connector, node agent, MQTT egress 1421, MQTT ingress 1422, Constrained Application Protocol (CoAP) ingress 1423, broker 1431 (e.g., Mosquitto), and/or applications 1431 and 1432.

According to one or more embodiments, an analytics server may include a device registry, analytics server 1410, rules database 1033, and a dashboard (e.g., user interface) may connect to an edge device 161 through a node agent and cloud connector. The broker may receive information from one or more avionics systems 1451, 1452, and/or 1453.

Figure 15:
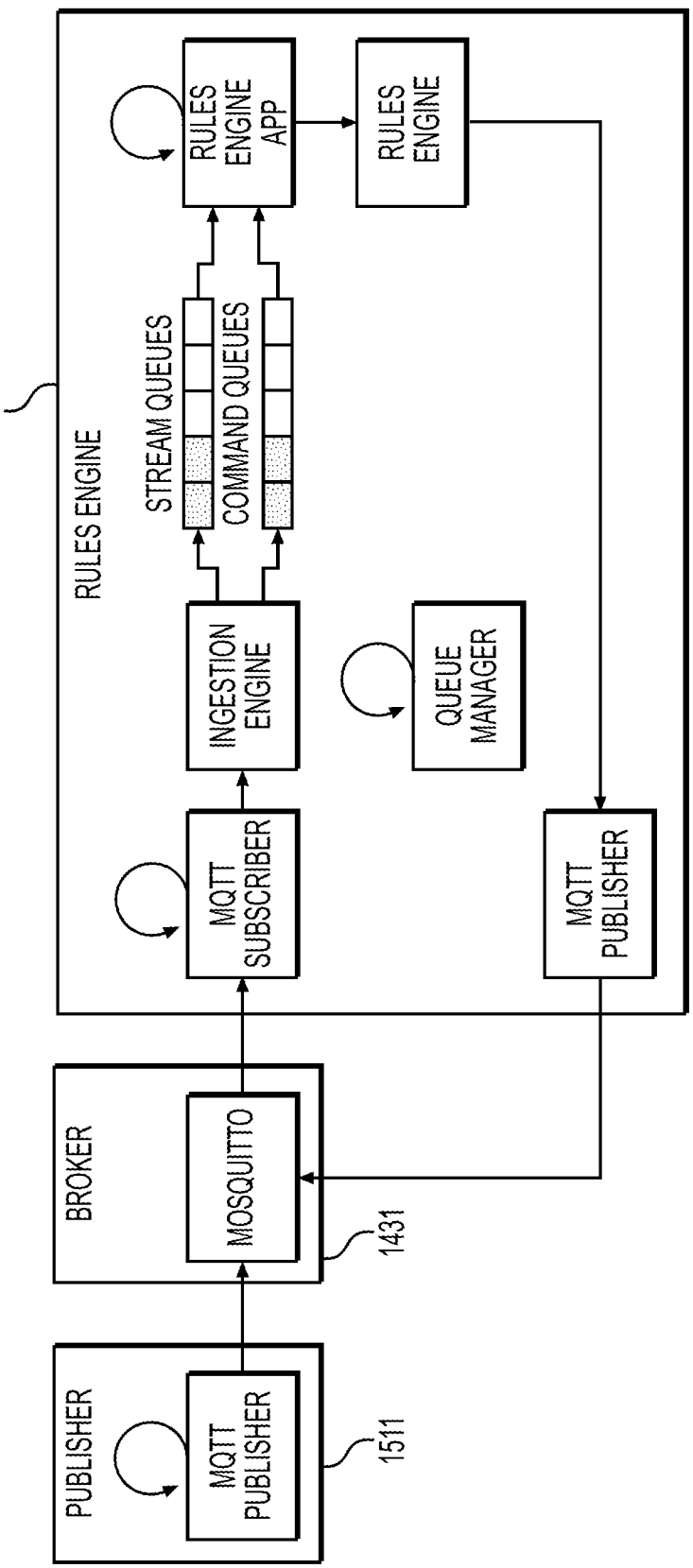
FIG. 15 depicts a diagram of a rules engine 307, according to one or more embodiments.

FIG. 15 depicts a diagram of a rules engine 307, according to one or more embodiments. The rules engine 307 is a component of the edge analytics framework SDK in which the cloud/server defined mathematical rules may be evaluated with the applications against the live data traffic. The edge analytics framework SDK may be built with a wrapper around a standard open source expression engine and this capability may be integrated with the end-to-end framework architecture. Applications may need to follow the SDK specification to utilize the rule expressions in their respective application logics.

The rules engine may be implemented with a plug and play (PnP) architecture to attach and/or detach advanced and a proprietary rules engine to support customized targets with minimal resource footprints.

Components of rules engine 307 may include a Message Queuing Telemetry Transport (MQTT) publisher, an MQTT subscriber, stream queue, command queue, an ingestion engine, a rules engine app, and a rules engine. The rules engine 307 may communicate with a broker 1431 and a publisher 1511.

The MQTT Publisher may be a data publisher, a component that is a part of data ingestion. MQTT is the protocol used by framework for getting the data into a CEP engine. Data published in the MQTT topic by the publisher component may be pushed to MQTT broker 1431 for broadcasting the data to subscribers.

The MQTT Subscriber may include a subscriber which is a component that is a part of data ingestion. MQTT is the protocol used by framework for subscribing the data from broker under a topic.

According to one or more embodiments, the ingestion engine may include the MQTT_Publisher 1511, Broker 1431 and MQTT_Subscriber components for getting the incoming data into CEP engine.

The stream queue may include data received in the ingestion engine is being converted into Streams and pushed into the Stream Queue.

The command queue may include commands configured in the server/cloud that are processed as commands and pushed into the command queue.

The queue manager is a component used to manage the stream queue and command queue.

The rules engine is the component which processes the rules configured in the server/cloud and evaluate streams in the Stream Queue with expressions constructed from the rules.

Figure 16:
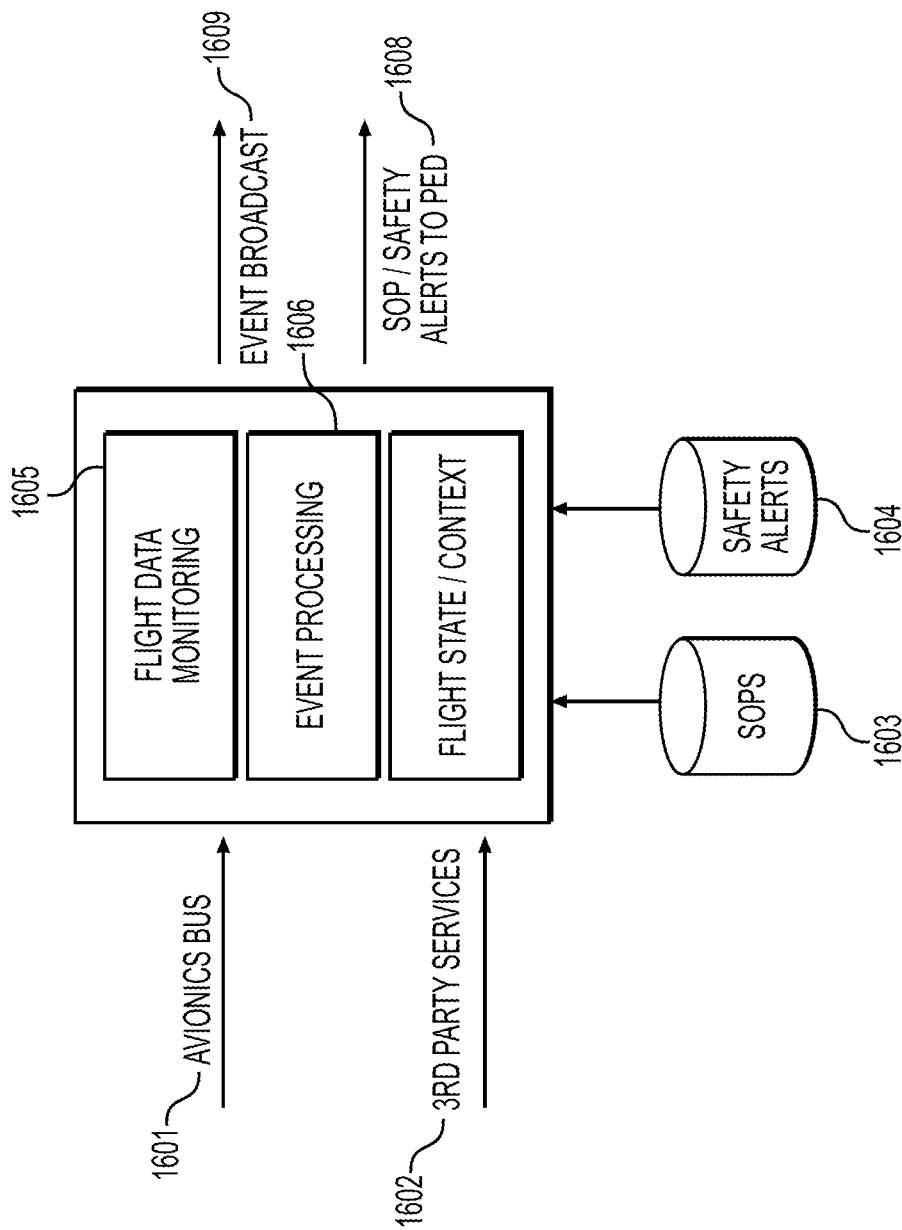
FIG. 16 depicts an example edge analytics process, according to one or more embodiments.

FIG. 16 depicts an example edge analytics process, according to one or more embodiments. Flight operational quality assurance (FOQA) recommendations (e.g., safety alerts 1604) are loaded routinely from an off-line FOQA program during the start of the flight.

According to one or more embodiments, flight data from an avionics bus 1601 and information from third-party services 1602 (e.g., weather information, traffic information, NOTAM, DATIS) may be sent to a flight module that includes flight data monitoring module 1605, event processing module 1605, and/or a flight state module. Additional inputs to the flight module may include SOPS 1603 and safety alerts 1604. The Flight State/Context module may process the external weather and traffic information relevant to the day of the flight and computes the state or context of the flight based on the SOP 1603 and safety alert 1604 rule set.

Flight data monitoring module 1605 may process the flight data from avionics bus to obtain the aircraft state, flight plan, system status, etc.

The safety alerts may be in the form of rules with a trigger condition and corresponding action. For example, a safety alert may be set for reducing taxi speed to 25 kts in summer at a particular airport (e.g., KPHX airport). Thus, the alert may notify a pilot in instances of sand ingestion from dry weather/dust storms in the engine leading to reduced performance. The corresponding safety alert may be defined by a trigger. As a non-limiting example, the trigger may be at KPHX airport, with the flight phase being taxi-out or taxi-in, a digital ATIS alert of a sandstorm, in the summer season. When the trigger occurs, an alert may be displayed, e.g., "taxi speed not to exceed 25 kts."

SOP database 1603 may be a rule set defining the top SOPs that the safety department has identified as needing monitoring based on the Airline FOQA analysis. Flight Data Monitoring Module 1604 may process the flight data from avionics bus to obtain the aircraft state, flight plan, system status etc. the flight state/context module may process the external weather and traffic information relevant to the day of the flight and computes the state or context of the flight based on the sop/safety alert rule set. for the rule defined above, this module computes the phase of flight, airport where the aircraft is currently grounded, ATIS alert for Sandstorm. The event processing module 1606 processes the rulesets (e.g., SOP 1603, Safety alerts 1604) to detect if any rule has been triggered and process the related action (e.g., display message, broadcast information, etc.). For example, the system may provide an event broadcast (e.g., step 1609) and/or provide an SOP/safety alert to a personal electronic device (e.g., step 1608) the triggered event may be broadcast Below is a sample workflow of rules engine 307 to execute the flight safety use case described in FIG. 16. Rules may be configured in a cloud server manager using a graphical user interface and/or using an expression language (e.g., pythonic or SQLish, plain English-like script based language to define conditions/thresholds).

Figure 17:
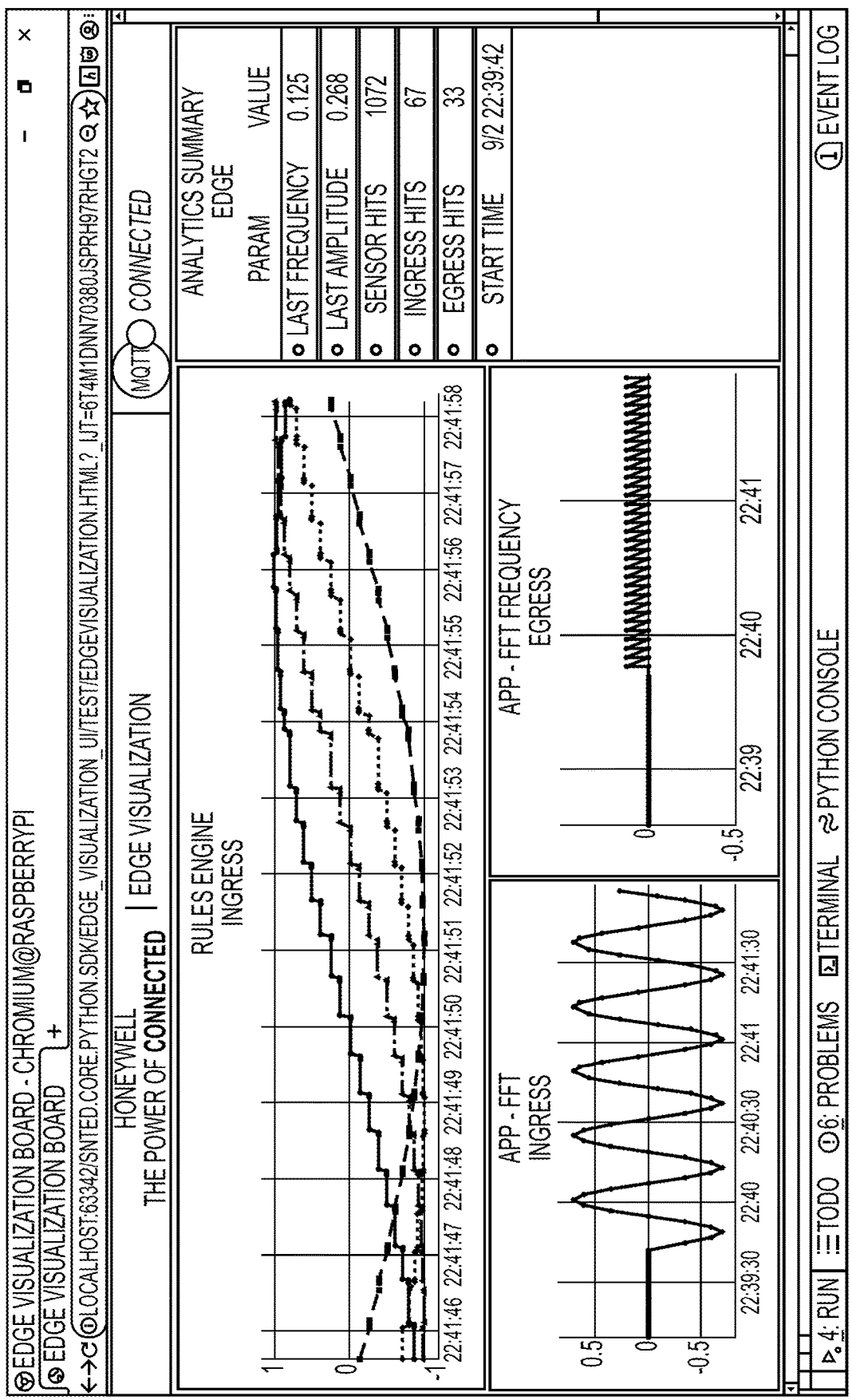
Figure 21:
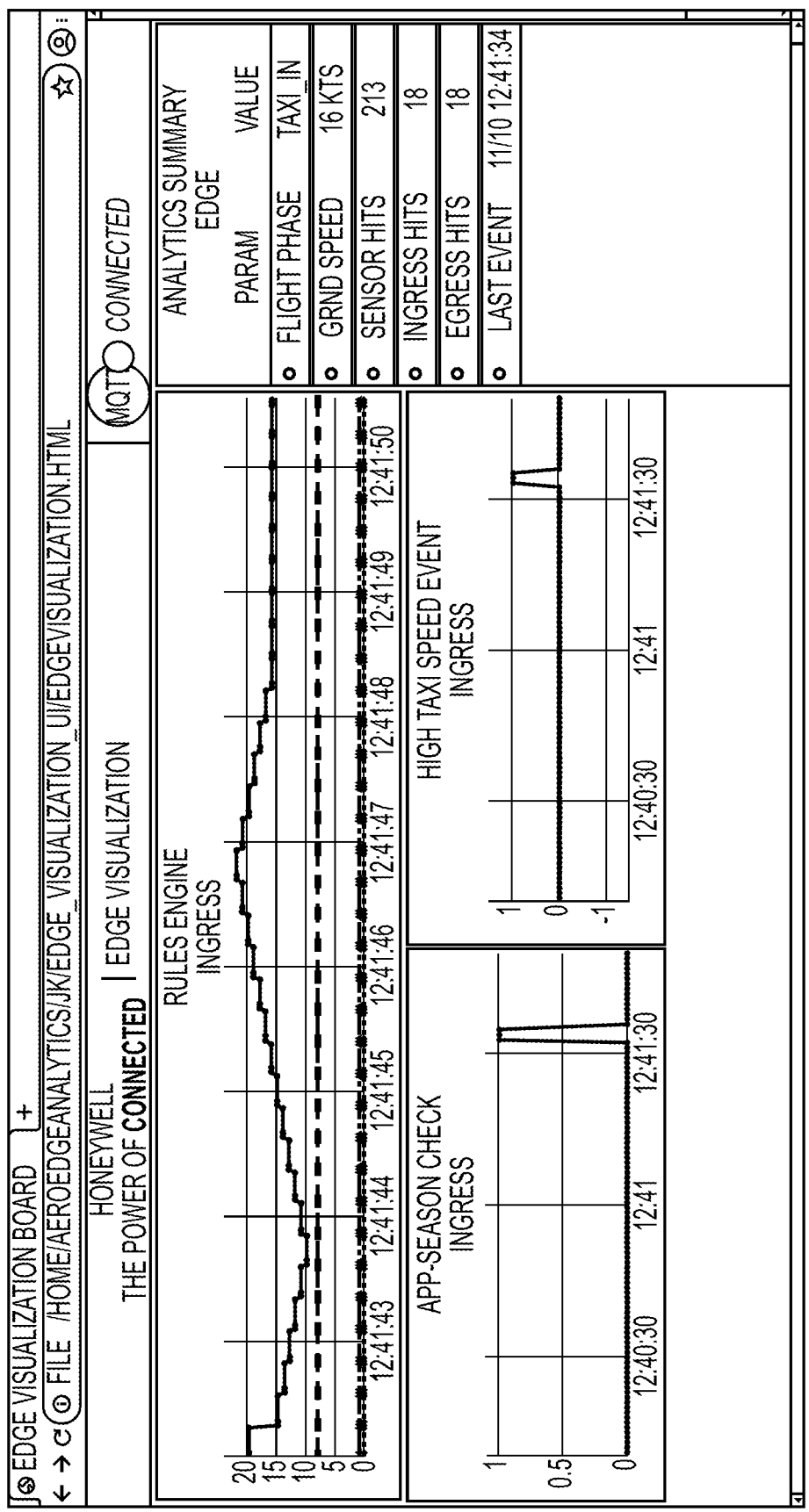

FIGS. 17-23 depict various exemplary graphical user interfaces for inputting the rules in the rules engine and displaying system status. For example, FIG. 17 depicts an edge visualization board, according to one or more embodiments. FIG. 18 depicts an exemplary graphical user interface for selecting predefined possible aggregate operations on stream data. As illustrated in FIG. 18, an SOP alert may be defined by a user. For example, a user may set the system to display an alert indicating "taxi speed not to exceed 25 kts" if a sandstorm occurs at KPHX airport during taxi-out or taxi-in. FIG. 19 depicts an example graphical user interface displaying an overview of the rules configured in the cloud manager. FIG. 20 depicts an example graphical user interface displaying a list of the data ingress. FIG. 22 depicts an example graphical user interface displaying a list of the rules configured in the cloud manager. FIG. 23 depicts an example graphical user interface displaying an application.

The rules configured in the cloud manager may be pushed to the edge device at runtime or may will be pulled whenever the edge device boots/connect with cloud manager. The rules may be simple and/or complex arithmetic operations applied which would be applied on the incoming data streams from sensor. The rules engine will get started and process the incoming data streams in a pre-configured periodic interval. Once the data pushed from data publisher reached rules engine it may be converted into stream and get pushed into stream queue. The rules engine may process the streams and evaluate them against the expressions created in the above step. Accordingly, events or alarms may be raised when the conditions defined in the rules are satisfied, otherwise data stream will be discarded for the sample taken. Events are published on the egress engine and propagated to cloud thereafter. There will be a snapshot of data streams saved in egress engine for later analysis.

Figure 24:
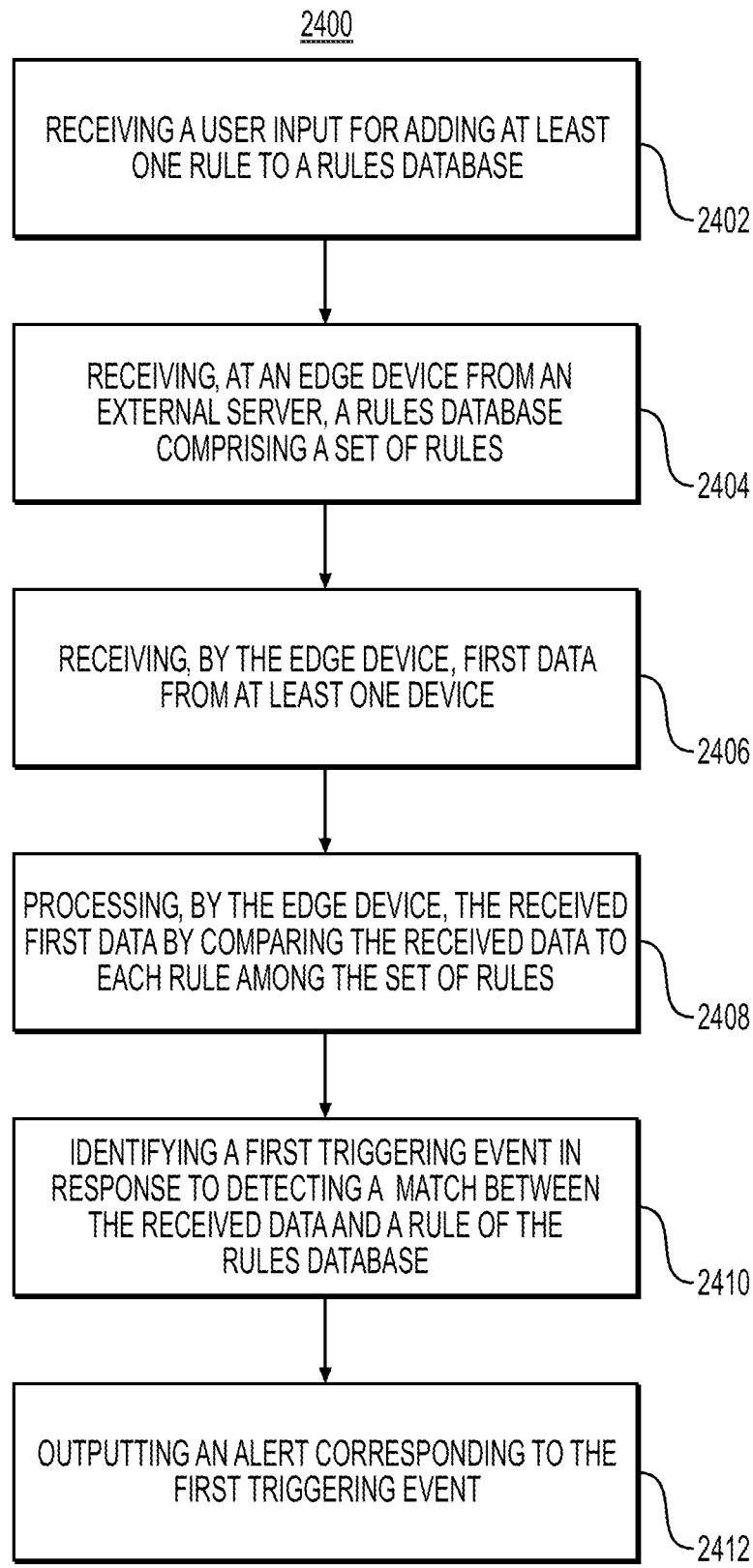
FIG. 24 depicts a flowchart for providing an edge analytics framework, according to one or more embodiments.

FIG. 24 depicts a flowchart for a method 2400 of providing an edge analytics framework, according to one or more embodiments. In step 2402, the method may include receiving a user input for adding at least one rule to a rules database. In step 2404, the method may include receiving, at an edge device from an external server, a rules database comprising a set of rules. In step 2406, the method may include receiving, by the edge device, first data from at least one device. In step 2408, the method may include processing, by the edge device, the received first data by comparing the received data to each rule among the set of rules. In step 2410, the method may include identifying a first triggering event in response to detecting a match between the received data and a rule of the rules database. In step 2412, the method may include outputting an alert corresponding to the first triggering event.

Figure 25:
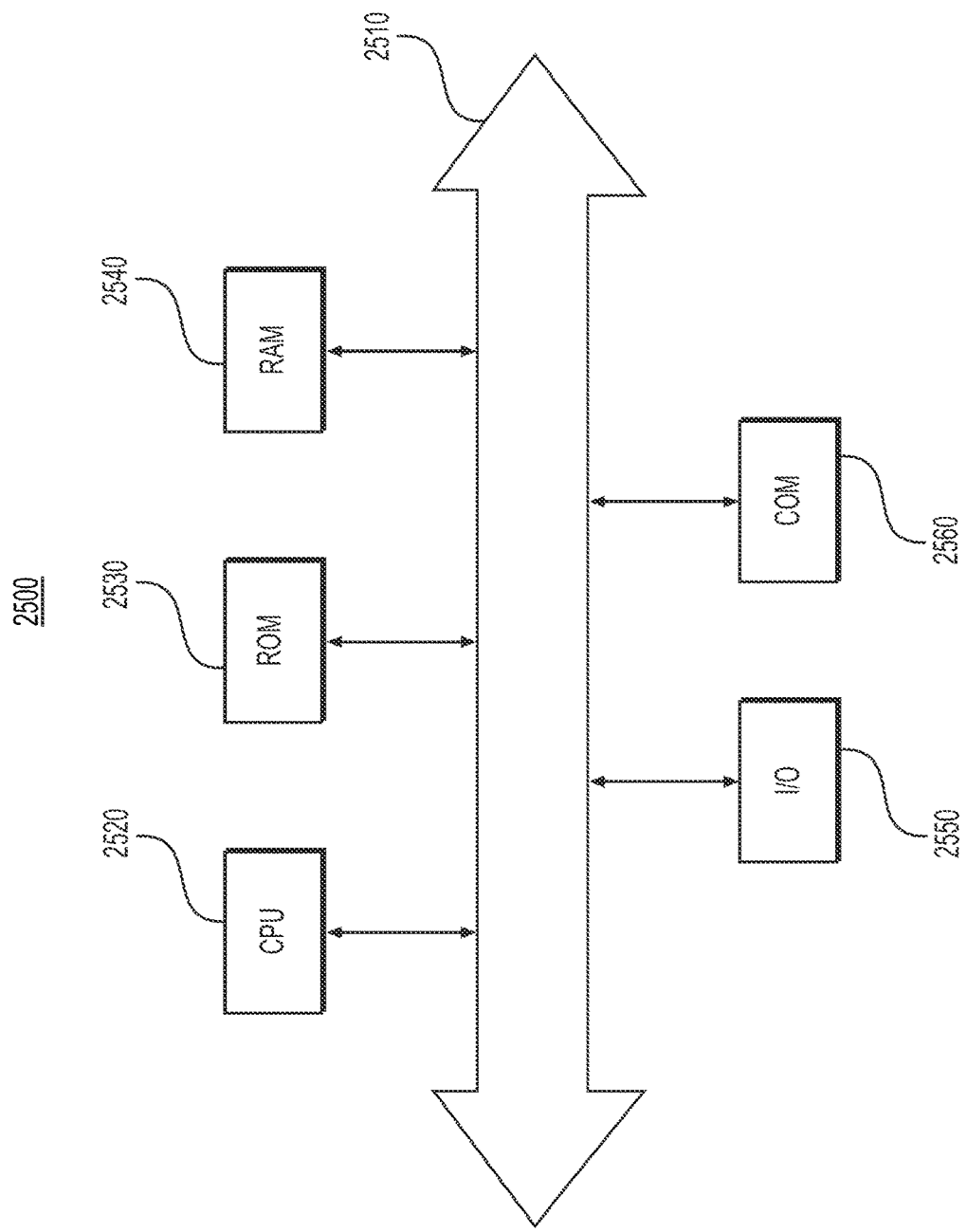
FIG. 25 depicts an example system that may execute techniques presented herein.

FIG. 25 depicts an example system 2500 that may execute techniques presented herein. FIG. 25 is a simplified functional block diagram of a computer that may be configured to execute techniques described herein, according to exemplary embodiments of the present disclosure. Specifically, the computer (or "platform" as it may not be a single physical computer infrastructure) may include a data communication interface 2560 for packet data communication. The platform also may include a central processing unit ("CPU") 2520, in the form of one or more processors, for executing program instructions. The platform may include an internal communication bus 2510, and the platform also may include a program storage and/or a data storage for various data files to be processed and/or communicated by the platform such as ROM 2530 and RAM 2540, although the system 2500 may receive programming and data via network communications. The system 2500 also may include input and output ports 2550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semi-conductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

In this disclosure, relative terms, such as, for example, "about," "substantially," "generally," and "approximately" are used to indicate a possible variation of ±10% in a stated value.

The term "exemplary" is used in the sense of "example" rather than "ideal." "One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, comprising:
   receiving, at an edge device from an external server, a rules database comprising a set of rules to be applied on incoming data streams obtained from one or more sensors of the edge device;
   sending, by the edge device, the rules database to a cloud for analytics, wherein the set of rules are modified in the cloud based on one or more real-time changes related to one or more events at an edge;
   receiving, by the edge device, first data from at least one device;
   receiving, by the edge device, the set of rules after modification;
   processing, by the edge device using one or more machine learning models, the received first data by automatically comparing the received data to each rule among the modified set of rules;
   identifying a first triggering event in response to detecting a match between the received data and a modified rule of the rules database, wherein the first triggering event is saved in the cloud for future analysis; and
   outputting an alert on a user interface corresponding to the first triggering event.

2. The method of claim 1, further comprising:
   receiving a user input for adding at least one rule to the rules database.

3. The method of claim 1, wherein the at least one device comprises a sensor connected to a vehicle.

4. The method of claim 1, wherein the first data is discarded if the first data and the rule of the rules database fails to match and wherein the first data comprises data related to at least one from among a speed of a vehicle, a weather event, and/or a status of a system.

5. The method of claim 1, wherein the first triggering event comprises a weather event and a speed of a vehicle and wherein the first triggering event is published on an egress engine and propagated to the cloud.

6. The method of claim 1, wherein the alert comprises displaying a message to an operator of a vehicle, wherein the message is any one of incoming data, a device life-cycle event, a REST API event, and an RPC request.

7. The method of claim 1, wherein a rule, among the set of rules, comprises a weather condition and a status of a vehicle, wherein the status of the vehicle is related to device safety, device efficiency, and device maintenance.

8. A non-transitory computer-readable medium storing instructions that, when executed by a processor, cause the processor to perform a method, the method comprising:
   receiving, at an edge device from an external server, a rules database comprising a set of rules to be applied on incoming data streams obtained from one or more sensors of the edge device;
   sending, by the edge device, the rules database to a cloud for analytics, wherein the set of rules are modified in the cloud based on one or more real-time changes related to one or more events at an edge;

receiving, by the edge device, first data from at least one device;

receiving, by the edge device, the set of rules after modification;

processing, by the edge device using one or more machine learning models, the received first data by automatically comparing the received data to each rule among the modified set of rules;

identifying a first triggering event in response to detecting a match between the received data and a modified rule of the rules database, wherein the first triggering event is saved in the cloud for future analysis; and outputting an alert on a user interface corresponding to the first triggering event.

9. The non-transitory computer-readable medium of claim 8, further comprising: receiving a user input for adding at least one rule to the rules database.

10. The non-transitory computer-readable medium of claim 8, wherein the at least one device comprises a sensor connected to a vehicle.

11. The non-transitory computer-readable medium of claim 8, wherein the first data is discarded if the first data and the rule of the rules database fails to match and wherein the first data comprises data related to at least one from among a speed of a vehicle, a weather event, and/or a status of a system.

12. The non-transitory computer-readable medium of claim 8, wherein the first triggering event comprises a weather event and a speed of a vehicle and wherein the first triggering event is published on an egress engine and propagated to the cloud.

13. The non-transitory computer-readable medium of claim 8, wherein the alert comprises displaying a message to an operator of a vehicle, wherein the message is any one of incoming data, a device life-cycle event, a REST API event, and an RPC request.

* * * * *